US010647072B2

(12) United States Patent
Takita et al.

(10) Patent No.: US 10,647,072 B2
(45) Date of Patent: May 12, 2020

(54) GUIDE DEVICE AND SCARFED SURFACE FORMING METHOD

(71) Applicant: MITSUBISHI HEAVY INDUSTRIES, LTD., Tokyo (JP)

(72) Inventors: Yuichi Takita, Tokyo (JP); Koji Ito, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 218 days.

(21) Appl. No.: 15/569,979

(22) PCT Filed: Sep. 13, 2016

(86) PCT No.: PCT/JP2016/076945
§ 371 (c)(1),
(2) Date: Oct. 27, 2017

(87) PCT Pub. No.: WO2017/047575
PCT Pub. Date: Mar. 23, 2017

(65) Prior Publication Data
US 2018/0104918 A1    Apr. 19, 2018

(30) Foreign Application Priority Data
Sep. 14, 2015  (JP) .................. 2015-180475

(51) Int. Cl.
*B27C 5/04*      (2006.01)
*B29C 73/26*    (2006.01)
(Continued)

(52) U.S. Cl.
CPC ............... *B29C 73/26* (2013.01); *B23C 1/20* (2013.01); *B23C 3/34* (2013.01); *B23C 9/00* (2013.01);
(Continued)

(58) Field of Classification Search
CPC .... B23C 3/34; B23C 9/00; B23Q 3/18; B23Q 9/0014; B23Q 9/0021; B23Q 9/028;
(Continued)

(56) References Cited

U.S. PATENT DOCUMENTS 626,718 A * 6/1899 Pearson .................... B27F 1/12
144/144.51
1,042,120 A * 10/1912 Kelley ..................... B27F 1/12
144/144.51
(Continued)

FOREIGN PATENT DOCUMENTS

JP    11-179609 A    7/1999
JP    2012-86289 A   5/2012

OTHER PUBLICATIONS

International Search Report in PCT/JP2016/076945, dated Dec. 6, 2016, 3pp.

*Primary Examiner* — Alan Snyder
*Assistant Examiner* — Yasir A Diab
(74) *Attorney, Agent, or Firm* — Kanesaka Berner and Partners LLP

(57) ABSTRACT

Provided is a router guide that comprises: a guide part that has a first through-hole and a guide surface that guides a cutting tool attachment part of a router device along the first through-hole; a maintaining part that maintains the position of the guide surface; and a positioning part that positions the guide part. The guide surface is formed such that, in a state where the maintaining part is in contact with a surface of a composite material, the distance from the surface becomes smaller as the guide surface approaches a second through-hole. The guide part is formed so as to be elastically deformable. In a case where the guide part is caused to elastically deform along the surface shape of the composite material, the maintaining part maintains the position of the
(Continued)

guide surface with respect to the surface at a position that corresponds to the surface shape.

6 Claims, 19 Drawing Sheets

(51) Int. Cl.
| | |
|---|---|
| *B23C 9/00* | (2006.01) |
| *B23Q 9/00* | (2006.01) |
| *B23C 1/20* | (2006.01) |
| *B23C 3/34* | (2006.01) |
| *B23Q 3/18* | (2006.01) |
| *B23Q 35/42* | (2006.01) |
| *B27C 5/10* | (2006.01) |

(52) U.S. Cl.
CPC ............. *B23Q 3/18* (2013.01); *B23Q 9/0042* (2013.01); *B23Q 9/0057* (2013.01); *B23Q 35/42* (2013.01); *B23Q 2210/008* (2013.01); *B23Q 2735/004* (2013.01); *B27C 5/04* (2013.01); *B27C 5/10* (2013.01); *B29C 2073/266* (2013.01); *B29C 2793/0054* (2013.01); *Y10T 409/303696* (2015.01)

(58) Field of Classification Search
CPC .... B23Q 9/0042; B23Q 9/005; B23Q 9/0057; B23Q 35/42; B27C 5/04; B27C 5/10; Y10T 409/30644; Y10T 409/306608; Y10T 409/303696
USPC .................. 144/143, 144.1, 144.51, 144.52
See application file for complete search history.

(56) References Cited

U.S. PATENT DOCUMENTS

| | | | | | |
|---|---|---|---|---|---|
| 1,751,816 | A * | 3/1930 | Hunter | ..................... | B27M 3/12 144/144.51 |
| 3,009,494 | A * | 11/1961 | Hinkley | ............... | A01G 23/067 144/24.12 |
| 3,033,298 | A * | 5/1962 | Johnson | ............. | B23Q 11/0046 175/209 |
| 3,068,577 | A * | 12/1962 | Wilson | ..................... | B43L 9/00 33/27.02 |
| 3,069,933 | A * | 12/1962 | McCall | ................... | B23B 47/28 408/109 |
| 3,146,675 | A * | 9/1964 | Anderson | ................ | B23B 51/05 409/179 |
| 3,148,562 | A * | 9/1964 | Moss | ..................... | B23B 47/28 408/75 |
| 3,192,801 | A * | 7/1965 | Gingras | .................. | B23G 1/16 408/9 |
| 3,261,098 | A * | 7/1966 | Twist, Jr. | ............. | B43M 99/007 33/18.1 |
| 3,292,494 | A * | 12/1966 | Anderson | ............ | B23Q 9/0021 409/179 |
| 3,442,309 | A * | 5/1969 | Jentsch | ................ | B23Q 9/0078 144/144.1 |
| 4,044,805 | A * | 8/1977 | Gronholz | ................ | B23C 3/126 144/154.5 |
| 4,306,598 | A * | 12/1981 | Peot | ....................... | B23Q 27/00 144/134.1 |
| 4,323,100 | A * | 4/1982 | Silken | .................... | B23Q 17/22 144/154.5 |
| 4,538,946 | A * | 9/1985 | Bloch | ....................... | B23C 3/00 144/136.95 |
| 4,603,719 | A * | 8/1986 | Durney | .................... | B27M 1/08 144/134.1 |
| 4,613,262 | A * | 9/1986 | Woods | ................. | B23Q 9/0014 408/111 |
| 4,798,506 | A * | 1/1989 | Kulp, Jr. | ................... | B23C 1/20 144/144.1 |
| 5,207,541 | A | 5/1993 | Westerman et al. | | |
| 5,285,831 | A * | 2/1994 | Woolgar | .............. | B23Q 9/0028 144/136.95 |
| 5,468,099 | A * | 11/1995 | Wheetley | ................ | B23B 39/04 180/8.1 |
| 5,533,556 | A * | 7/1996 | Whitney | .............. | B23Q 9/0042 144/144.1 |
| 5,882,756 | A | 3/1999 | Alston et al. | | |
| 5,895,183 | A * | 4/1999 | McDaniel | ............... | B23B 51/05 30/300 |
| 6,129,489 | A * | 10/2000 | Linderholm | ........ | B23K 37/0217 408/76 |
| 6,296,426 | B1 * | 10/2001 | King | ..................... | B23B 49/026 408/76 |
| 6,694,635 | B1 * | 2/2004 | Sidebottom | ............... | B27M 3/12 33/638 |
| 6,981,328 | B2 * | 1/2006 | Solum | ....................... | B43L 9/02 33/27.02 |
| 7,971,611 | B1 * | 7/2011 | Wells | ................. | B23Q 11/0046 144/136.95 |
| 9,782,838 | B2 * | 10/2017 | Pedersen | ............... | B23B 49/026 |
| 2003/0029623 | A1 * | 2/2003 | Kopras | ................. | B25H 1/0078 173/1 |
| 2004/0265077 | A1 * | 12/2004 | Boyl-Davis | ............. | B23B 39/14 408/1 R |
| 2013/0045060 | A1 * | 2/2013 | Brugman | .............. | B23Q 9/0042 409/131 |

* cited by examiner

GUIDE DEVICE AND SCARFED SURFACE FORMING METHOD

RELATED APPLICATIONS

The present application is a National phase of International Application No. PCT/JP2016/076945, filed Sep. 13, 2016, and claims priority based on Japanese Patent Application No. 2015-180475, filed Sep. 14, 2015.

TECHNICAL FIELD

The present invention relates to a guide device which guides a router device in accordance with a surface shape of a workpiece and a scarfed surface forming method of forming a circular scarfed surface in a plan view on a surface of the workpiece.

BACKGROUND ART

In a case where a surface of a part configured of a composite material such as a fiber reinforced plastic (FRP) is damaged by impact, in order to restore the damaged surface, a technology is known in which the damaged portion is removed by scarf processing by which a circular conical shape in a plan view is processed, and the surface (hereinafter, referred to as a "scarfed surface") formed by the scarf processing is supplemented with a new composite material so as to perform restoration. Currently, the scarf processing is performed manually, and thus, the scarf processing takes a long working time. Moreover, in a case where the scarf processing is performed manually, there is a problem that appropriate processing accuracy cannot be obtained when a reference of a range or a depth to be processed by the scarf processing cannot be visually recognized from the workpiece itself.

In order to solve the above-described problem, a dedicated processing device for performing the scarf processing is described in the PTL 1. The processing device of PTL 1 has a mechanism in which a processing tool is fixed to a movable frame and the scarf processing is performed by moving the frame.

CITATION LIST

Patent Literature

[PTL 1] Specification of U.S. Pat. No. 5,207,541

SUMMARY OF INVENTION

Technical Problem

However, the processing device described in PTL 1 is a complicated device including a plurality of mechanisms in order to correspond to conditions of various processing surfaces. Accordingly, there is a problem that a manufacturing cost of the device increases and the device cannot be sufficiently adopted in a case where an area of the damaged portion to be processed is narrow.

In addition, in a case where the scarf processing is performed on a workpiece having a complicated curved surface shape (for example, a double contour shape having a curvature in a plurality of directions) of a main wing, a tail, a body, or the like of an aircraft, it is difficult to appropriately dispose the processing device with respect to the damaged portion.

The present invention is made in consideration of the above-described circumstances, and an object thereof is provide a guide device and a scarfed surface forming method capable of being applied to even a case where a processing area of a workpiece is narrow, a case where a complicated curved surface shape is provided, or a case where a reference of the scarf processing cannot be visually recognized from the workpiece itself, and performing the scarf processing manually with sufficient processing accuracy without using a dedicated processing device for performing the scarf processing.

Solution to Problem

In order to achieve the above-described objects, the present invention adopts the following means.

According to an aspect of the present invention, there is provided a guide device which guides a router device, which rotates a cutting tool having an outer peripheral surface on which a cutting portion is formed and cuts a workpiece coming into contact with the cutting portion, in accordance with a surface shape of the workpiece having a curvature in at least a predetermined direction, including: a guide portion which includes a first through-hole into which the cutting tool can be inserted, and a guide surface which guides an attachment portion of the router device to which the cutting tool is attached in a state where the cutting tool is inserted into the first through-hole along the first through-hole; a holding portion which comes into contact with a surface of the workpiece and holds a position of the guide surface with respect to the surface of the workpiece; and a positioning portion which includes a second through-hole into which a positioning pin positioned in a positioning hole formed in the workpiece is inserted and positions the guide portion at a predetermined position in a radial direction intersecting an axis in which the positioning pin extends in a state where the positioning pin is inserted into the second through-hole, in which the guide surface is formed such that a distance from the surface of the workpiece decreases as the guide surface approaches the second through-hole in a state where the holding portion is in contact with the surface of the workpiece, the guide portion is formed to be elastically deformable, and in a case where the guide portion is elastically deformed in accordance with the surface shape of the workpiece, the holding portion holds the position of the guide surface with respect to the surface of the workpiece at a position corresponding to the surface shape.

According to the guide device of the aspect of the present invention, the guide portion is positioned at the predetermined position in the radial direction intersecting the axis in which the positioning pin extends in a state where the positioning pin is inserted into the second through-hole of the positioning portion. The guide portion can be elastically deformed. Accordingly, in a case where the guide portion is elastically deformed in accordance with the surface shape of the workpiece, the position of the guide surface with respect to the surface of the workpiece is held by the holding portion. In this state, if the cutting tool of the router device is inserted into the first through-hole and cuts the surface of the workpiece, the guide surface is held at the position in accordance with the surface shape of the workpiece. Therefore, the reference groove in accordance with the surface shape of the workpiece is formed on the workpiece.

A worker performing scarf processing manually cuts the surface of the workpiece so as to have the same depth as that of the reference groove formed on the surface of the workpiece. Accordingly, the periphery of the reference groove which is deeper as the reference groove approaches the second through-hole is cut, and the scarfed surface about the position of the second through-hole is formed on the surface of the workpiece.

In this way, according to the guide device of the aspect of the present invention, the reference groove is formed in a state where the guide portion is elastically deformed in accordance with the surface shape of the workpiece. Accordingly, even in a case where a processing area of the workpiece is narrow, in a case where a complicated curved surface shape is provided, or in a case where the reference of the scarf processing cannot be visually recognized from the workpiece itself, it is possible to perform the scarf processing manually with sufficient processing accuracy without using a dedicated processing device for performing the scarf processing.

In the guide device according to the aspect of the present invention, the guide portion, the holding portion, and the positioning portion may be formed as a single member formed of an elastic material.

Accordingly, by elastically deforming the guide device formed as a single member formed of an elastic material in accordance with the surface shape of the workpiece, it is possible to form the reference groove in accordance with the surface shape of the workpiece.

In the guide device having the above-described configurations, a plurality of the guide portions having the first through-hole extending in the radial direction may be formed at a plurality of positions around the axis.

Accordingly, the guide device formed as a single member formed of an elastic material is elastically deformed in accordance with the surface shape of the workpiece, and the cutting tool of the router device is sequentially inserted into each of the first through-holes having the plurality of guide portions, and thus, it is possible to form the plurality of reference grooves in accordance with the surface shape of the workpiece.

In the guide device having the above-described configurations, the first through-hole may be formed in a spiral shape which extends in a circumferential direction around the axis.

Accordingly, the guide device formed as a single member formed of an elastic material is elastically deformed in accordance with the surface shape of the workpiece, the cutting tool of the router device moves along the first through-hole which is included in the guide portion and is formed in a spiral shape, and thus, it is possible to form the spiral reference groove in accordance with the surface shape of the workpiece.

In the guide device having the above-described configurations, the holding portion may include a contact portion which is formed to surround the first through-hole and comes into contact with the surface of the workpiece, and a recessed groove portion which communicates with a suction hole connected to a negative pressure source, and in a case where air in the recessed groove portion is discharged from the suction hole by the negative pressure source in a state where the contact portion is in contact with the surface of the workpiece, the guide portion may be elastically deformed in accordance with the surface shape of the workpiece.

Accordingly, the guide device formed as a single member formed of an elastic material is elastically deformed in accordance with the surface shape of the workpiece, air is discharged from the suction hole by the operation of the negative pressure source from the space partitioned by the recessed groove portion and the surface of the workpiece, and thus, the guide device can be adsorbed to the surface of the workpiece. Therefore, the state where the guide device is elastically deformed in accordance with the surface shape of the workpiece can be easily maintained.

In the guide device according to the aspect of the present invention, the guide portion may be a plate-shaped metal member, and the holding portion may be a plurality of pin members which are formed to protrude from a plurality of locations on one surface of the metal member.

Accordingly, the plate-shaped metal member is elastically deformed in accordance with the surface shape of the workpiece, and thus, it is possible to form the reference groove in accordance with the surface shape of the workpiece.

According to another aspect of the present invention, there is provided a scarfed surface forming method of forming a circular scarfed surface in a plan view on a surface of a workpiece in accordance with a surface shape of the workpiece having a curvature in at least a predetermined direction, including:

a reference groove forming step of forming reference grooves extending in a radial direction orthogonal to a circumferential direction and becoming deeper as the reference groove approach a reference position of the workpiece at a plurality of positions in the circumferential direction around the reference position of the workpiece; and a scarfed surface forming step of cutting the surface of the workpiece on which the plurality of reference grooves are formed in the reference groove forming step such that a depth of a region of the surface of the workpiece interposed between the reference grooves is the same as a depth of the reference groove and forming the scarfed surface on the surface of the workpiece, in which in the reference groove forming step, the plurality of reference grooves are formed such that the reference grooves adjacent to each other are not connected to each other.

According to the scarfed surface forming method of another aspect of the present invention, when the plurality of reference grooves are formed at the plurality of positions in the circumferential direction around the reference position of the workpiece, the reference grooves adjacent to each other are not connected to each other.

Accordingly, for example, even in a case where the reference groove is formed in a workpiece which is a composite material or the like obtained by reinforcing a resin with fibers and has quasi-isotropic properties, it is possible to prevent the plurality of reference grooves from being connected to each other, prevent stress applied to the connection portion from being released, and thus, prevent the quasi-isotropic properties from being not capable of being held.

In addition, the plurality of reference grooves are formed so as to be deeper as the reference grooves approach the reference position. Accordingly, the reference grooves are cut such that the depth of the region interposed between the reference grooves is the same as that of the reference groove, and thus, a circular conical-shaped scarfed surface in a plan view can be formed on the workpiece.

Advantageous Effects of Invention

According to the present invention, it is possible to provide a guide device and a scarfed surface forming method capable of being applied to even a case where a processing area of a workpiece is narrow, a case where a complicated curved surface shape is provided, or a case where a reference of the scarf processing cannot be visually recognized from the workpiece itself, and performing the scarf processing manually with sufficient processing accuracy without using a dedicated processing device for performing the scarf processing.

DESCRIPTION OF EMBODIMENTS

First Embodiment

Figure 1:
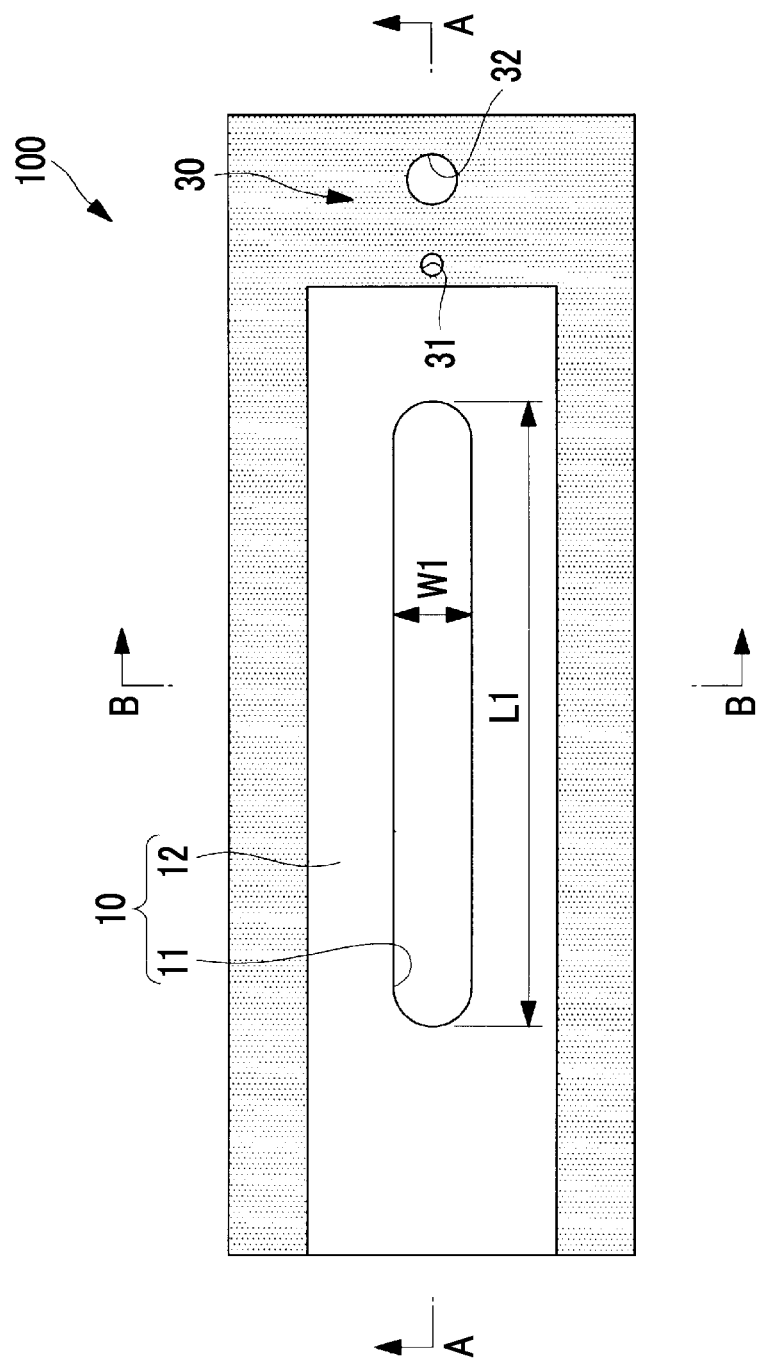
FIG. 1 is a plan view showing a router guide of a first embodiment.

Hereinafter, a router guide 100 of a first embodiment of the present invention will be described with reference to the drawings.

The router guide (guide device) 100 of the present embodiment is a device which guides a router device 200 in accordance with a surface shape of a composite material (workpiece) 300 having a curvature in at least a predetermined direction and forms reference grooves 320 for performing scarf processing manually on a surface 300a of the composite material 300.

For example, as the composite material 300 of the present embodiment, a carbon fiber composite material (CFRP) in which a plurality of fiber layers made of carbon fibers and a plurality of resin layers are alternately laminated in a thickness direction can be adopted. In addition, for example, a glass fiber composite material (GFRP) in which a plurality of fiber layers made of glass fibers and a plurality of resin layers are alternately laminated in a thickness direction can be adopted.

In addition, the composite material 300 of the present embodiment is a member having a curvature in at least a predetermined direction. For example, as the composite material 300, a member having a curvature in only one direction may be adopted. In addition, as the composite material 300, a double contour shaped composite material 300 having curvatures in a plurality of directions may be adopted. Moreover, as the composite material 300, a member having a complicated curved surface enough to enable the router guide 100 to elastically deform and follow the surface shape may be adopted.

Figure 2:
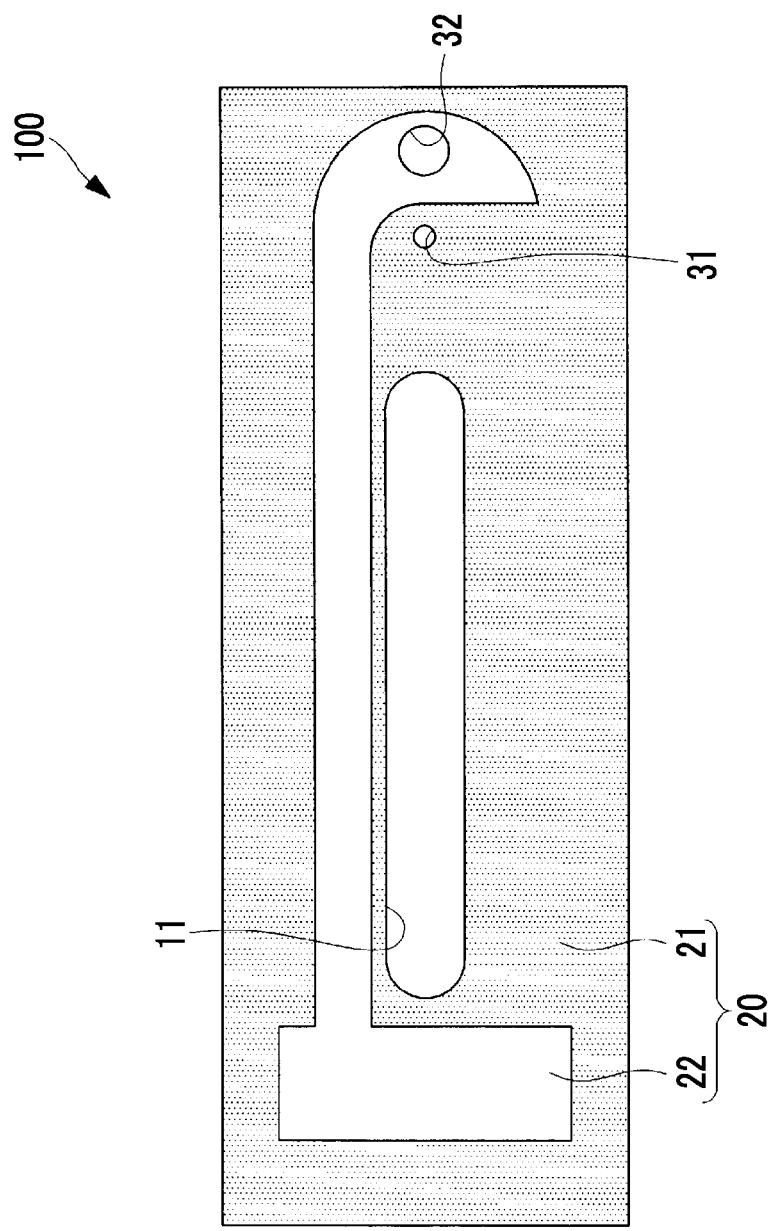
FIG. 2 is a bottom view showing a router guide of the first embodiment.

As shown in a plan view of FIG. 1 and a bottom view of FIG. 2, the router guide 100 is a device in which a guide portion 10 which has a first through-hole 11 and a guide surface 12, a holding portion 20 which comes into contact with the surface 300a of the composite material 300 (refer to FIG. 5) and holds the position of the guide surface 12 with respect to the surface 300a, and a positioning portion 30 which has a second through-hole 31 into which a positioning pin 400 (refer to FIG. 5) is inserted are formed as a single member formed of an elastically deformable elastic material.

For example, as the elastic material configuring the router guide 100, a urethane resin having hardness of 60 to 90 and a plate thickness of 15 mm to 20 mm can be adopted.

Figure 3:
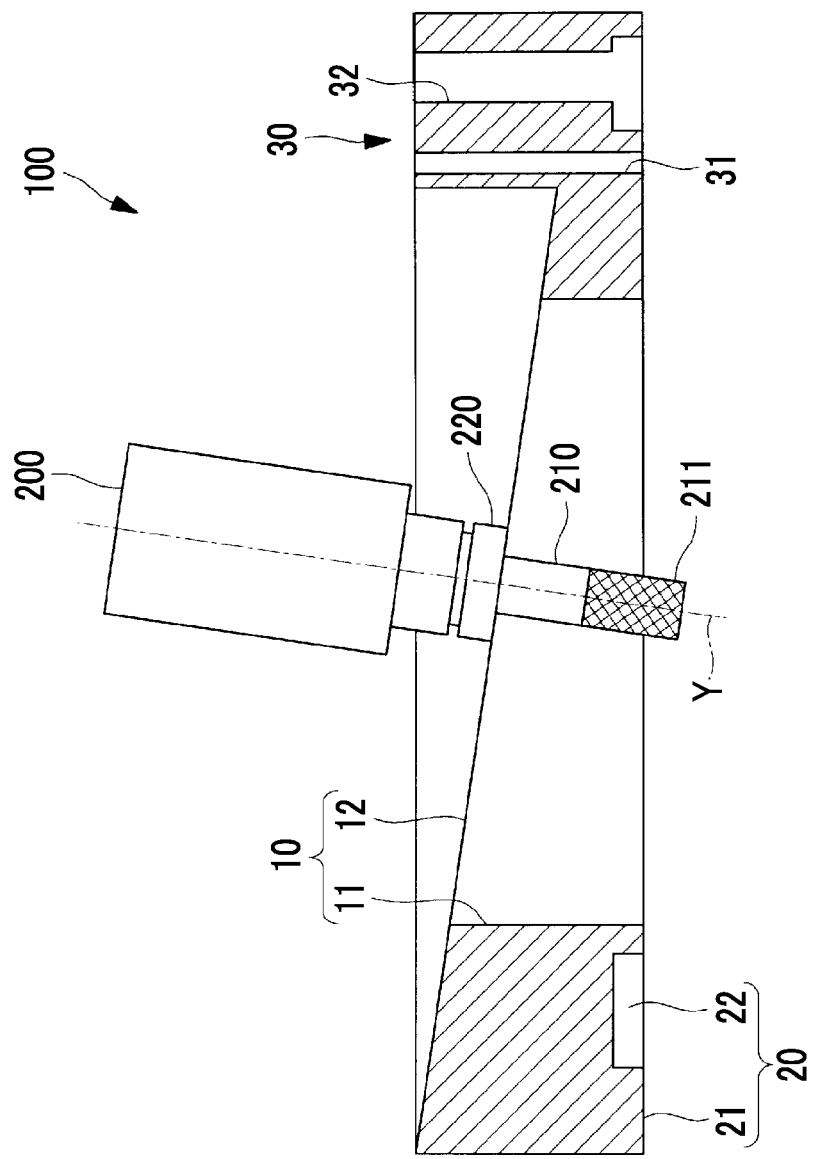
FIG. 3 is a longitudinal sectional view taken along line A-A of the router guide shown in FIG. 1.

The router device 200 shown in FIG. 3 (a sectional view taken along line A-A of the router guide 100 shown in FIG. 1) is a device which rotates a cutting tool 210 having an outer peripheral surface, on which a cutting portion 211 is formed, around an axis Y to cut the composite material 300 which is in contact with the cutting portion 211. The cutting tool 210 is detachably attached to a cutting tool attachment portion 220. As shown in FIG. 3, a lower surface of the cutting tool attachment portion 220 is pressed to the guide surface 12, and in a state where the lower surface of the cutting tool attachment portion 220 is guided by the guide surface 12, a tip portion of the cutting tool 210 protrudes from a bottom surface (contact portion) 21 of the holding portion 20.

Here, the guide surface 12 and the first through-hole 11 included in the guide portion 10 of the router guide 100 will be described.

As shown in FIG. 3, the guide surface 12 of the router guide 100 is a surface which guides the lower surface of the cutting tool attachment portion 220 of the router device 200 to which the cutting tool 210 is attached along the first through-hole 11 in a state where the cutting tool 210 of the router device 200 is inserted into the first through-hole 11.

Figure 4:
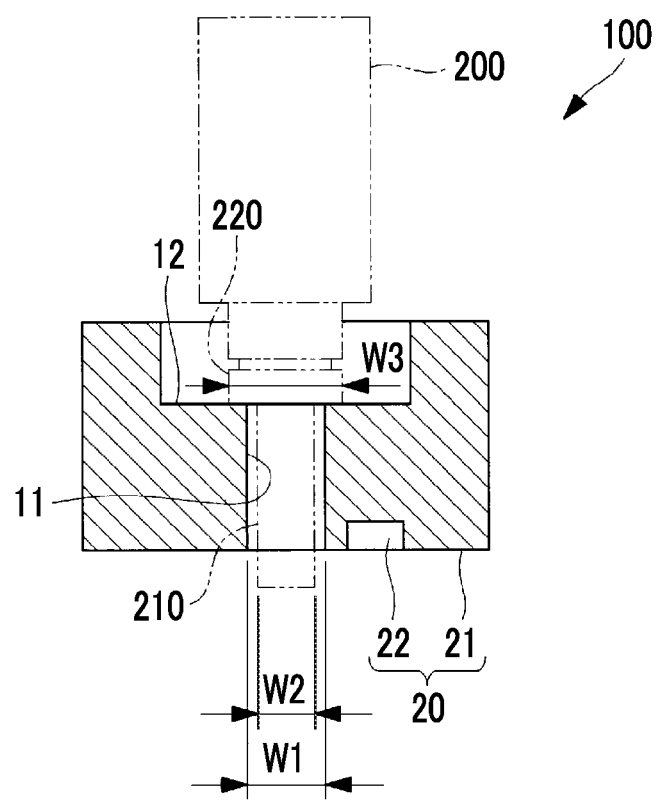
FIG. 4 is a longitudinal sectional view taken along line B-B of the router guide shown in FIG. 1.

As shown in FIG. 1, a length of the first through-hole 11 formed in the router guide 100 is defined as L1, a width thereof is defined as W1, and the first through-hole 11 is a long hole in which the length L1 is greater than the width W1. As shown in FIG. 4 (a sectional view taken along line B-B of the router guide 100 shown in FIG. 1), the width W1 of the first through-hole 11 is greater than a width W2 of the cutting tool 210 of the router device 200 and is smaller than a width W3 of the cutting tool attachment portion 220. Accordingly, if the cutting tool 210 of the router device 200 is inserted into the first through-hole 11, the lower surface of the cutting tool attachment portion 220 comes into contact with the guide surface 12 of the guide portion 10.

Next, the holding portion 20 of the router guide 100 will be described.

As shown in FIG. 2, the holding portion 20 includes the bottom surface 21 which is formed to surround the first through-hole 11 and comes into contact with the surface 300a of the composite material 300 and a recessed groove portion 22 which communicates with a suction hole 32 connected to a negative pressure source (not shown). In a case where the holding portion 20 is elastically deformed in accordance with the surface shape of the composite material 300, the bottom surface 21 comes into contact with the surface 300a of the composite material 300. Meanwhile, the recessed groove portion 22 forms a closed space, which communicates with the negative pressure source via the suction hole 32, along with the surface 300a of the composite material 300.

The router guide 100 having the guide portion 10 is formed of an elastic material. Accordingly, in a case where air in the recessed groove portion 22 is discharged from the suction hole 32 by the negative pressure source (not shown) in a state where the bottom surface 21 is in contact with the surface 300a of the composite material 300, the state where the router guide 100 is elastically deformed in accordance with the surface shape of the composite material 300 by the operation of the negative pressure source is maintained.

Figure 5:
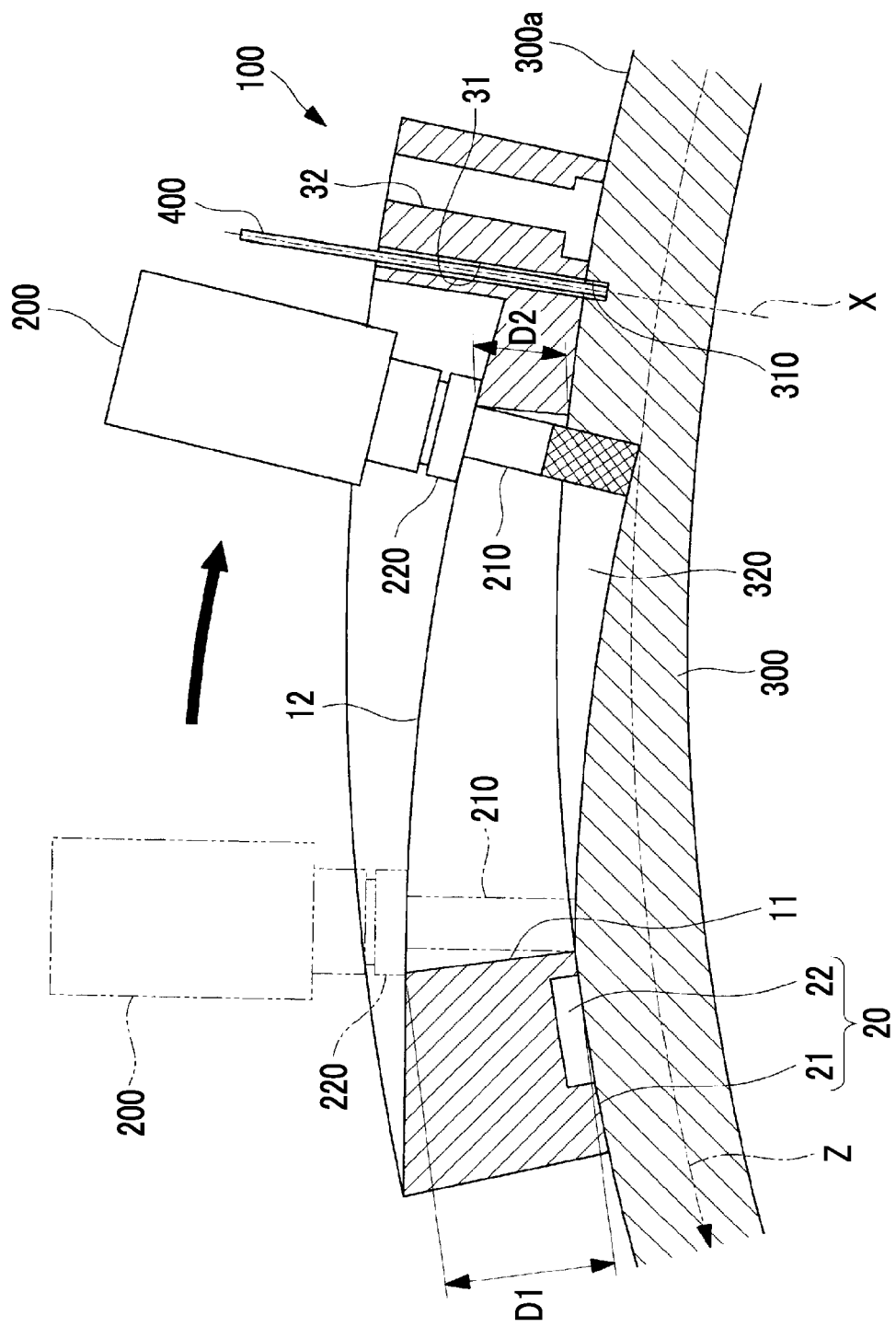
FIG. 5 is a longitudinal sectional view showing a state where the router guide of the first embodiment is attached to a composite material.

FIG. 5 shows the state where the router guide 100 is elastically deformed in accordance with the surface shape of the composite material 300 by the operation of the negative pressure source. As shown in FIG. 5, the guide surface 12 is formed such that a distance from the surface 300a gradually decreases from D1 to D2 as the guide surface 12 approaches the second through-hole 31 in a state where the bottom surface 21 of the holding portion 20 is in contact with the surface of the composite material 300.

In addition, as shown in FIG. 5, in a case where the guide portion 10 is elastically deformed in accordance with the surface shape of the composite material 300, the bottom surface 21 of the holding portion 20 holds the position of the guide surface 12 with respect to the surface 300a at the position in accordance with the surface shape of the composite material 300.

Next, the positioning portion 30 of the router guide 100 will be described.

As shown in FIG. 5, the positioning portion 30 includes the second through-hole 31 into which the positioning pin 400 positioned in the positioning hole 310 formed in the composite material 300 is inserted. The positioning portion 30 causes the guide portion 10 to be positioned at a predetermined position in a radial direction extending along an axis Z orthogonal to an axis X in which the positioning pin 400 extends in a state where the positioning pin 400 is inserted into the second through-hole 31.

As shown in FIG. 5, a worker operating the router device 200 inserts the cutting tool 210 of the router device 200 into an end portion (a position shown by dashed lines in FIG. 5) of the first through-hole 11 farthest from the second through-hole 31 in a state where the router guide 100 is positioned at the composite material 300 by the positioning portion 30. The worker operating the router device 200 moves the router device 200 in a direction approaching the second through-hole 31 while causing the lower surface of the cutting tool attachment portion 220 to come into contact with the guide surface 12, and moves the router device 200 to an end portion (a position shown by solid lines in FIG. 5) of the first through-hole 11 closest to the second through-hole 31 in a state where the composite material 300 is cut by the cutting tool 210.

According to the above-described operations, the reference groove 320 formed by the cutting portion 211 of the cutting tool 210 is formed on the surface 300a of the composite material 300. The guide surface 12 is formed such that the distance from the surface 300a gradually decreases from D1 to D2 as the guide surface 12 approaches the second through-hole 31. Accordingly, the reference groove 320 is formed so as to be gradually deeper as the reference groove 320 approaches the second through-hole 31.

In this way, the second through-hole 31 of the router guide 100 is positioned in the positioning hole 310 of the composite material 300 by the positioning pin 400. Accordingly, it is possible to form the reference groove 320 on the surface 300a of the composite material 300 at a predetermined position in the radial direction about the positioning hole 310 using the router device 200.

Next, a step of forming a plurality of reference grooves 320 at a plurality of positions in the circumferential direction about the positioning hole 310 on the surface 300a of the composite material 300 will be described.

Figure 6:
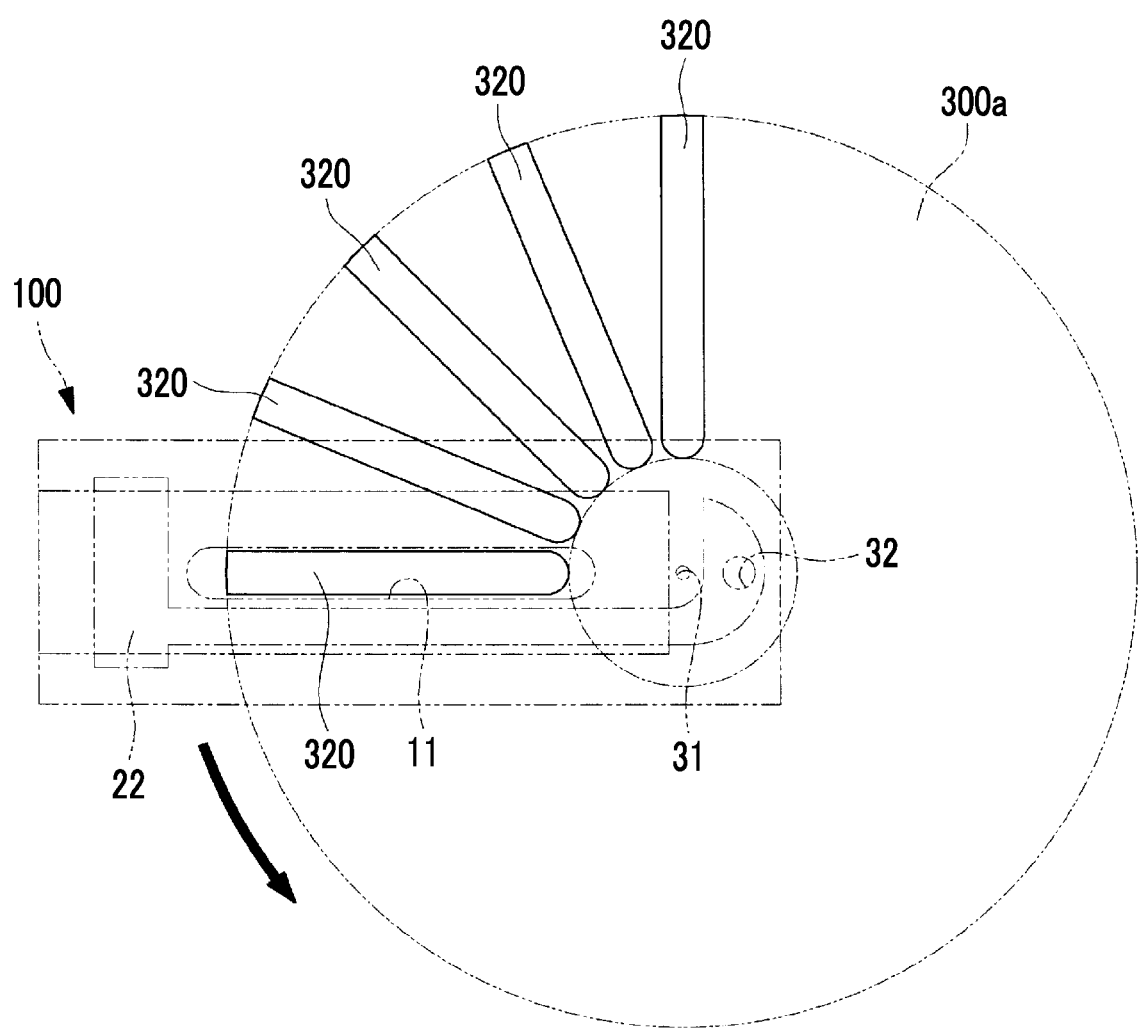
FIG. 6 is a plan view showing a composite material in which a plurality of reference grooves are formed using the router guide of the first embodiment.

FIG. 6 is a plan view showing the composite material 300 in which the plurality of reference grooves 320 are formed using the router guide 100 of the present embodiment. The router guide 100 shown by dashed lines in FIG. 6 is fixed to the positioning hole 310 (not shown) of the composite material 300 in a state where the positioning pin 400 (not shown) is inserted into the second through-hole 31.

A worker operating the router device 200 continuously performs the following steps (1) to (3) (reference groove forming step) to form the plurality of reference grooves 320 extending in the radial direction orthogonal to the circumferential direction at a plurality of position in the circumferential direction around the reference position at which the positioning hole 310 of the surface 300a of the composite material 300 is disposed. The reference groove 320 becomes a groove which is deeper as it approaches the reference position of the positioning hole 310.

The steps (1) to (3) are as follows.

(1) The worker operates the negative pressure source to adsorb the router guide 100 to the surface 300a of the composite material 300.

(2) The worker inserts the cutting tool 210 of the router device 200 into the first through-hole 11 of the router guide 100 and moves the cutting tool 210 in the direction approaching the second through-hole 31 to form the reference groove 320.

(3) The worker cancels the operation of the negative pressure source and rotates the router guide 100 in the circumferential direction (a direction shown by an arrow in FIG. 6) about the positioning hole 310.

FIG. 6 shows a state where the reference grooves 320 having the same length as each other are formed at equal intervals at five locations in the circumferential direction about the positioning hole 310 by performing the above-described operations (1) to (3) five times.

Figure 7:
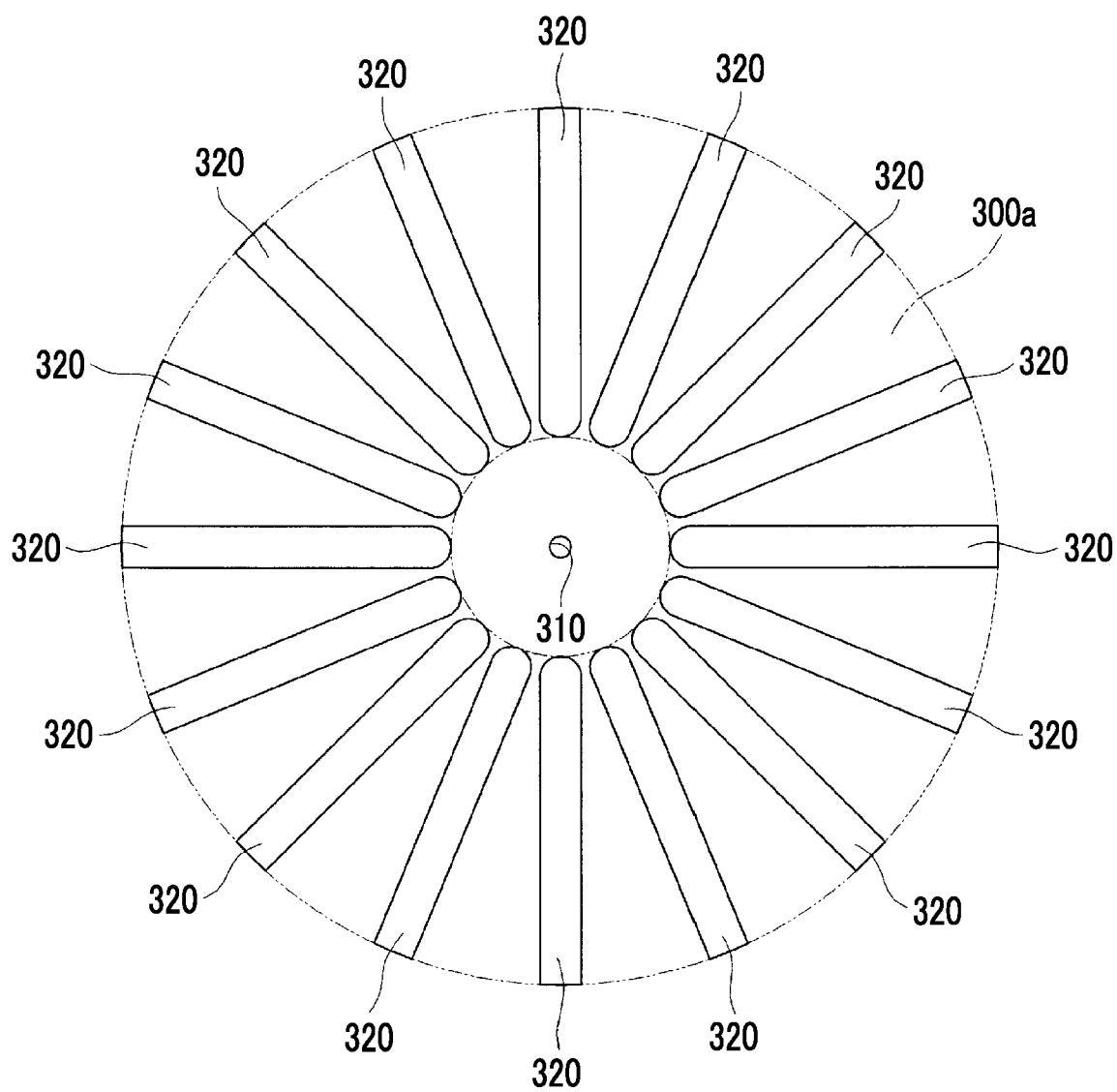
FIG. 7 is a plan view showing the composite material in which the plurality of reference grooves are formed using the router guide of the first embodiment.

In addition, FIG. 7 shows a state where the reference grooves 320 having the same length as each other are formed at equal intervals at sixteen locations on the entire circumference in the circumferential direction about the positioning hole 310 by performing the above-described operations (1) to (3) sixteen times.

Moreover, as shown in FIG. 6, the reference grooves 320 are continuously formed in the counterclockwise direction such that the reference grooves 320 are not disposed on the surface 300a of the composite material 300 to which the recessed groove portion 22 included in the holding portion 20 of the router guide 100 is adsorbed.

As shown in FIG. 6, in a case where the router guide 100 is disposed on the surface 300a of the composite material 300, the recessed groove portion 22 is disposed at the position which is rotated in the counterclockwise direction in the circumferential direction around the positioning hole 310 with respect to the reference groove 320. In this case, the surface 320 on which the reference groove 300a is not formed is disposed below the recessed groove portion 22.

Meanwhile, if the reference grooves 320 are continuously formed in the clockwise direction, the recessed groove portion 22 is disposed at the position at which the reference groove 320 is formed. In this case, the closed space is not formed between the recessed groove portion 22 and the surface 300a of the composite material 300, and thus, the router guide 100 cannot be adsorbed to the surface 300a of the composite material 300. Accordingly, in the present embodiment, the reference grooves 320 are continuously formed in the counterclockwise direction.

As shown in FIG. 7, the end portions of the reference grooves 320 close to the positioning hole 310 are separated from each other so as not to be connected to each other. Accordingly, in a case where the reference groove is formed in a composite material which is obtained by reinforcing a resin with fibers and has quasi-isotropic properties, it is possible to prevent the plurality of reference grooves from being connected to each other, prevent stress applied to the connection portion from being released, and thus, prevent the quasi-isotropic properties from being not capable of being held.

Figure 8:
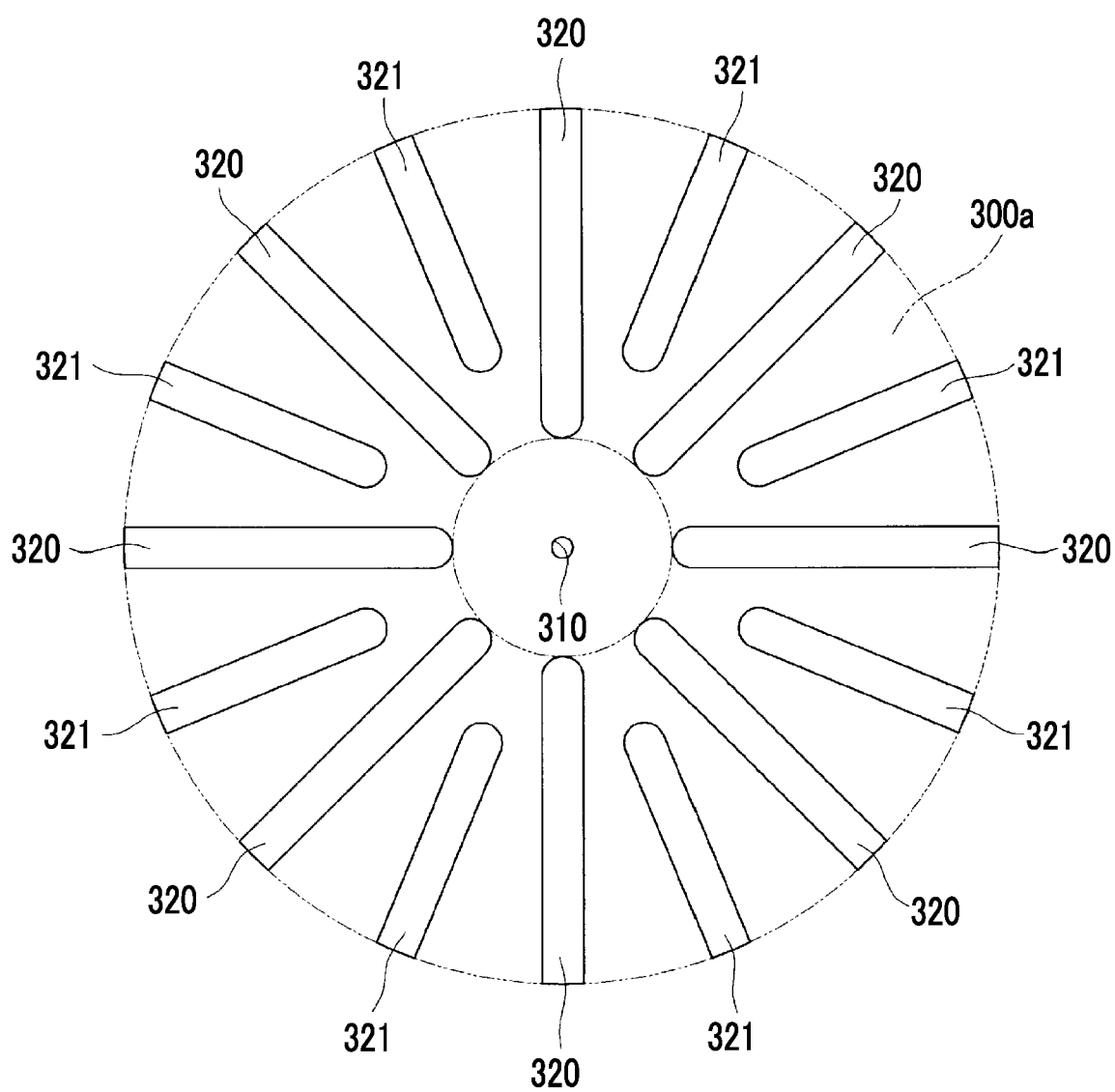
FIG. 8 is a plan view showing a modification example of the composite material in which the plurality of reference grooves are formed using the router guide of the first embodiment.

In addition, in order to further prevent the connections between the plurality of reference grooves and the state where quasi-isotropic properties cannot be held, as a modification example shown in FIG. 8, the reference grooves 320 and reference grooves 321 may be alternately formed in the circumferential direction. The modification example shown in FIG. 8 is an example in which the reference grooves 320 which have long lengths in the radial direction passing through the positioning hole 310 and the reference grooves 321 which have short lengths in the radial direction and in which end portions on the positioning hole 310 side are retreated to the outside in the radial direction are alternately formed in the circumferential direction.

The reference grooves 320 and the reference grooves 321 are formed as the modification example shown in FIG. 8, and thus, compared to the example shown in FIG. 7, the adjacent reference grooves 320 and 321 are not connected to each other and can be sufficiently separated from each other.

In a case where the reference grooves 321 shown in the modification example of FIG. 8 are formed on the surface 300a of the composite material 300, a stopper 230 is disposed in the router guide 100.

Figure 9:
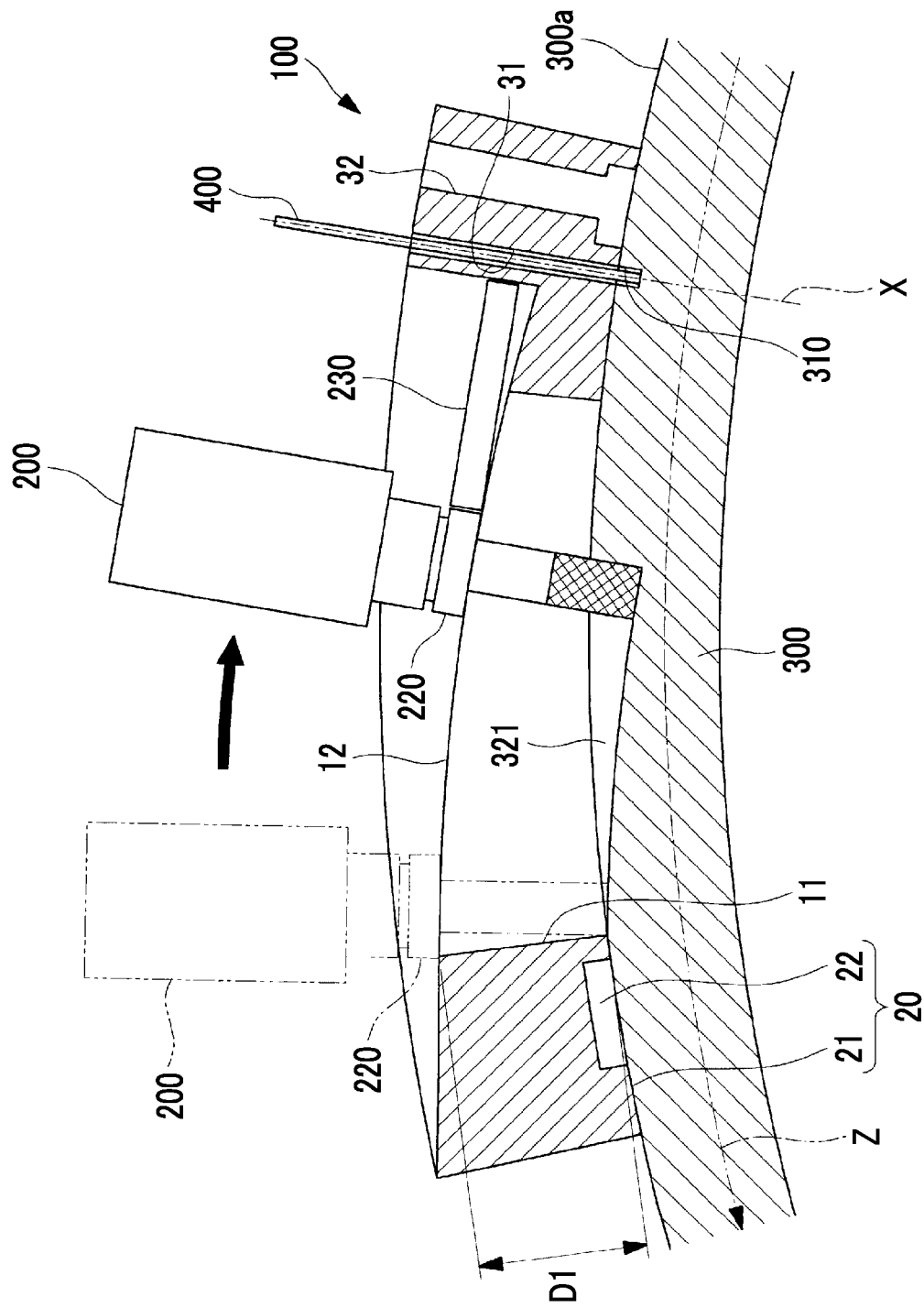
FIG. 9 is a longitudinal sectional view showing a modification example of the state where the router guide of the first embodiment is attached to the composite material.

As shown in FIG. 9, the stopper 230 is disposed on the second through-hole 31 of the guide surface 12, and thus, the router device 200 is restricted such that the router device 200 does not reach the end portion of the first through-hole 11 on the second through-hole 31 side. By using this stopper 230, it is possible to form the reference grooves 321 on the surface 300a of the composite material 300 using the router guide 100 used when the reference grooves 320 are formed.

After the reference grooves 320 (reference grooves 321) are formed at the plurality of positions in the circumferential direction about the positioning hole 310 as shown in FIG. 7 or 8, a worker performing scarf processing manually cuts the surface 300a of the composite material 300 such that areas other than the reference grooves 320 (reference grooves 321) have the same depth as those of the reference grooves 320 (reference grooves 321) using an air tool (not shown).

The air tool is a device which rotates an abrasive member using an air pressure as an operation source and cuts the surface 300a of the composite material 300 by causing the rotating abrasive member to come into contact with the surface 300a of the composite material 300 by a manual operation of a worker.

By cutting the surface 300a of the composite material 300 using the air tool, the peripheries of the reference grooves becoming deeper as the reference grooves approach the second through-hole 31 are cut, and thus, a scarfed surface about the position (the position of the positioning hole 310) of the second through-hole 31 is formed on the surface 300a of the composite material 300 (scarfed surface forming step).

Figure 10:
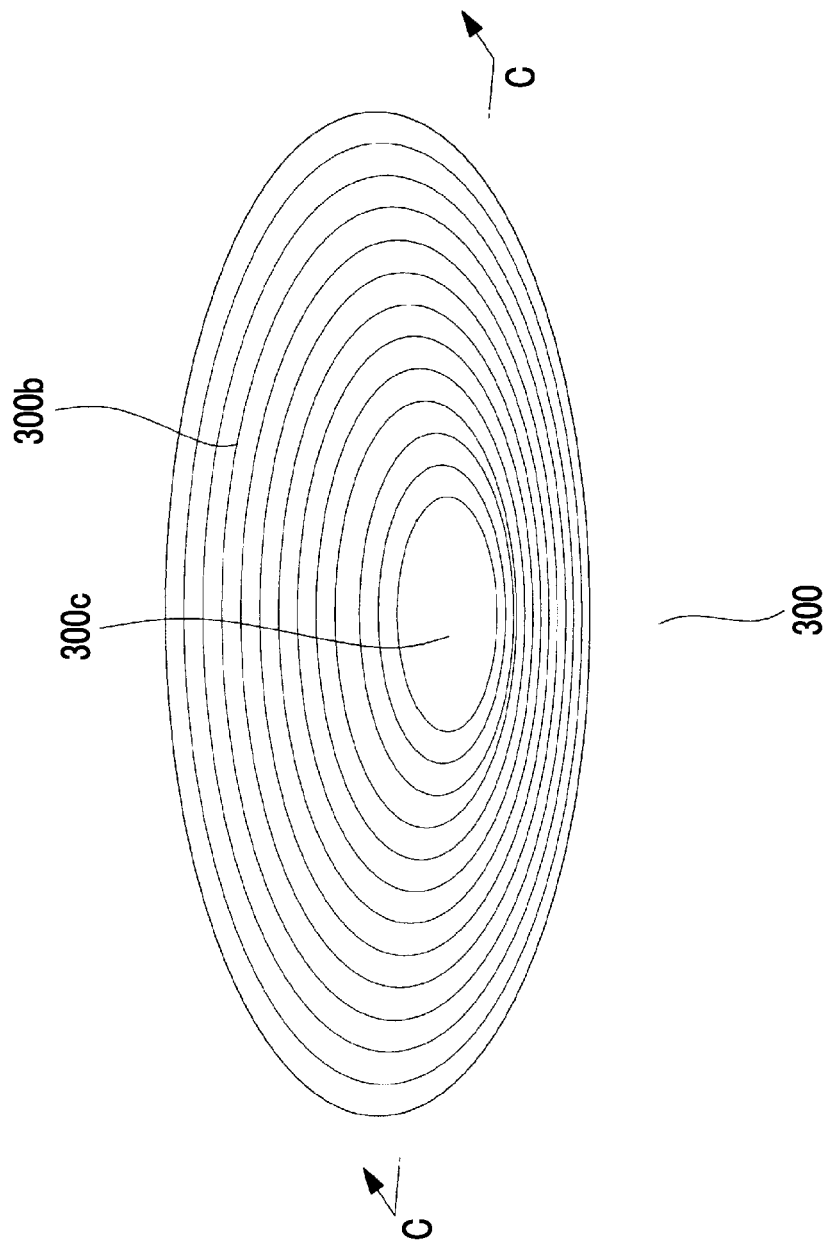
FIG. 10 is a perspective view showing the composite material on which a scarfed surface is formed.

FIG. 10 is a perspective view showing the composite material 300 on which the scarfed surface is formed. In addition, FIG. 11 is a sectional view taken along line C-C of the composite material 300 shown in FIG. 10.

Figure 11:
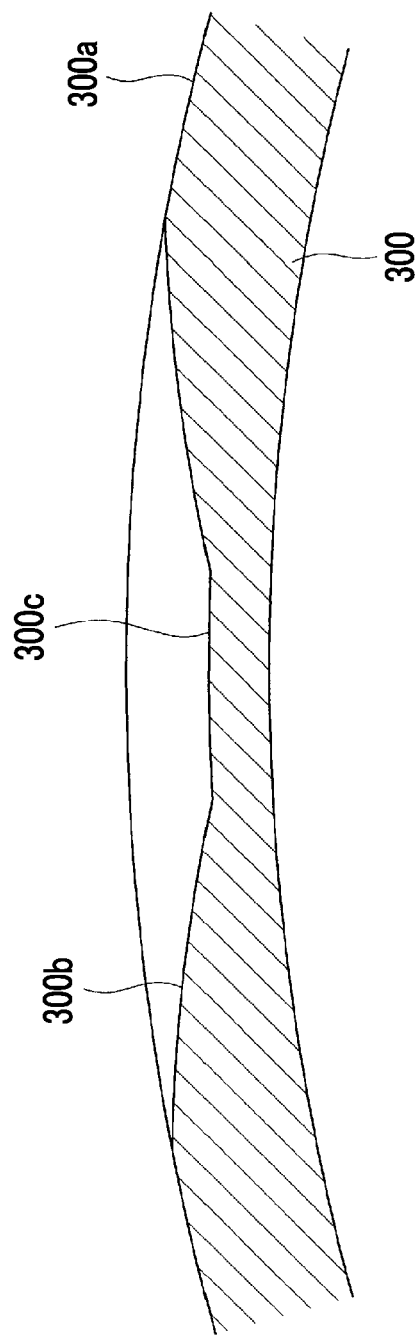
FIG. 11 is a longitudinal sectional view taken along line C-C of the composite material on which the scarfed surface as shown in FIG. 10 is formed.

A reference numeral 300b shown in FIGS. 10 and 11 is the scarfed surface and a reference numeral 300c is a bottom surface portion which is surrounded by the scarfed surface 300b.

As shown in FIGS. 10 and 11, the scarfed surface 300b is a surface which is formed in a conical shape so as to be gradually deeper from the outer peripheral side toward the inner peripheral side, and is a circle in a plan view. The bottom surface portion 300c is a surface which is formed to have a shape approximately coincident with the surface shape of the composite material 300 and is a circle in a plan view.

In addition, solid lines shown in the scarfed surface 300b in FIG. 10 indicate fiber layers of the composite material 300. In a case where a worker can sufficiently recognize the fiber layers shown in FIG. 10 visually, the scarfed surface 300b can be formed based on the fiber layers (for example, the number of the fiber layers required for forming a desired scarfed surface 300b). However, it is possible to more reliably form the scarfed surfaces 300b based on both the fiber layers and the reference grooves 320 (reference grooves 321).

In addition, in a case where a worker cannot sufficiently recognize the fiber layers shown in FIG. 10 visually, it is not possible to form a desired scarfed surface 300b based on the fiber layers. Even in this case, based on the reference grooves 320 (reference grooves 321), a worker can form a desired scarfed surface 300b using an air tool.

Action and effects of the router guide 100 of the above-described present embodiment will be described.

According to the router guide 100 of the present embodiment, the guide portion 10 is positioned at a predetermined position in the radial direction along the axis Z intersecting the axis X along which the positioning pin 400 extends in a state where the positioning pin 400 is inserted into the second through-hole 31 of the positioning portion 30. The guide portion 10 can be elastically deformed. Thereby, in a case where the guide portion 10 is elastically deformed in accordance with the surface shape of the composite material 300, the position of the guide surface 12 with respect to the surface 300a is held by the guide portion 10. In this state, if the cutting tool 210 of the router device 200 is inserted into the first through-hole 11 and cuts the surface of the composite material 300, the guide surface 12 is held at the position in accordance with the surface shape of the composite material 300. Therefore, the reference grooves 320 in accordance with the surface shape of the composite material 300 are formed on the composite material 300.

A worker performing the scarf processing manually cuts the surface 300a of the composite material 300 so as to have the same depth as that of the reference groove 320 formed on the surface 300a of the composite material 300. Accordingly, the peripheries of the reference grooves 320 are cut so as to be deeper as the reference grooves 320 approach the second through-hole 31, and the scarfed surface 300b about the position of the second through-hole 31 is formed on the surface of the composite material 300.

In this way, according to the router guide 100 of the present embodiment, the reference grooves 320 are formed in a state where the guide portion 10 is elastically deformed in accordance with the surface shape of the composite material 300. Accordingly, even in a case where a processing area of the composite material 300 is narrow, in a case where a complicated curved surface shape is provided, or in a case where the reference of the scarf processing cannot be visually recognized from the composite material 300 itself, it is possible to perform the scarf processing manually with sufficient processing accuracy without using a dedicated processing device for performing the scarf processing.

In the router guide 100 of the present embodiment, the guide portion 10, the holding portion 20, and the positioning portion 30 are formed as a single member formed of an elastic material.

Accordingly, by elastically deforming the router guide 100 formed as a single member formed of an elastic material in accordance with the surface shape of the composite material 300, it is possible to form the reference grooves 320 in accordance with the surface shape of the composite material 300.

Second Embodiment

Next, a second embodiment of the present invention will be described. The present embodiment is a modification example of the first embodiment, and is assumed to be similar to the first embodiment unless otherwise described below.

The router guide 100 of the first embodiment includes a single guide portion 10 having the first through-hole 11.

Meanwhile, in a router guide 101 of the present embodiment, a plurality of guide portions 10a having first through-holes 11a extending radially are formed at a plurality of positions around the axis X along which the positioning pin 400 extends.

Figure 12:
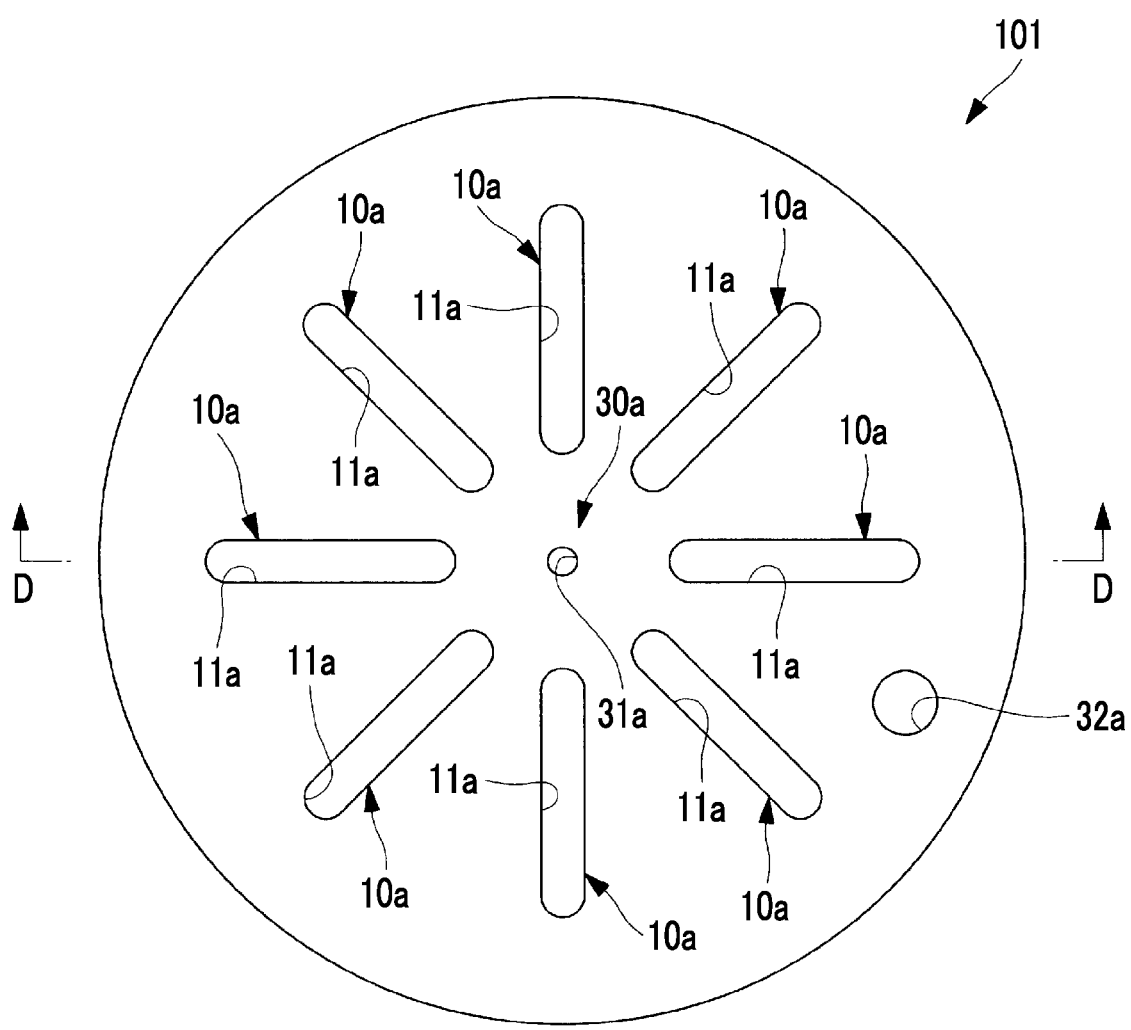
FIG. 12 is a plan view showing a router guide of a second embodiment.
Figure 13:
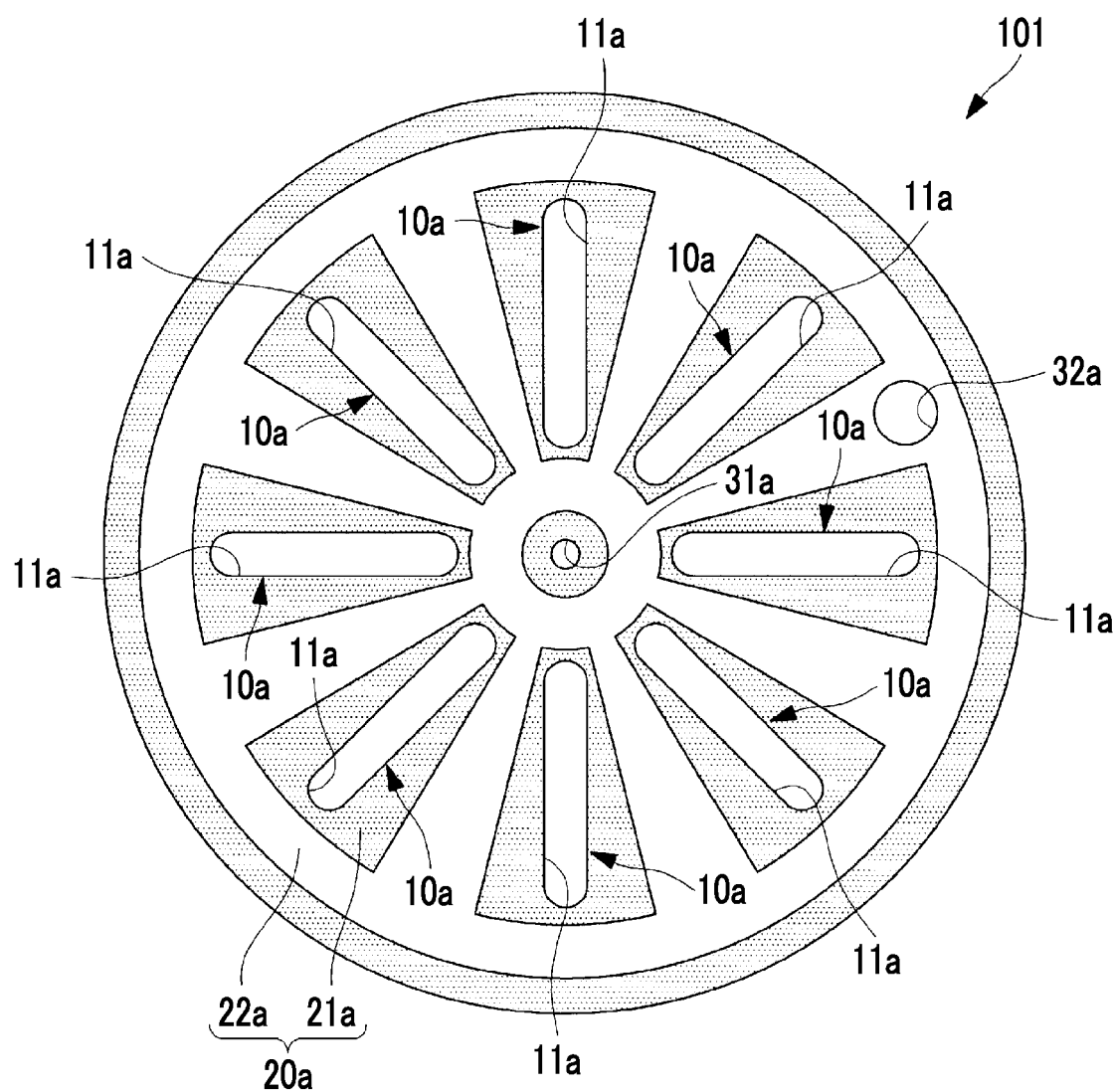
FIG. 13 is a bottom view showing the router guide of the second embodiment.

As shown in a plan view of FIG. 12 and a bottom view of FIG. 13, the router guide 101 is a device in which the guide portion 10a which has the first through-holes 11a and guide surfaces 12a (refer to FIG. 14), holding portions 20a which come into contact with the surface 300a of the composite material 300 (refer to FIG. 14) and hold the positions of the guide surfaces 12a with respect to the surface 300a, and the positioning portion 30a which has the second through-hole 31a into which the positioning pin 400 (refer to FIG. 5) is inserted are formed as a single member formed of an elastically deformable elastic material.

As shown in FIGS. 12 and 13, in the router guide 101 of the present embodiment, the plurality of guide portions 10a having the first through-holes 11a extending radially are radially formed at the plurality of positions in the circumferential direction about the second through-hole 31a into which the positioning pin 400 is inserted.

As shown in FIG. 13, each of the holding portions 20a includes a bottom surface 21a which is formed to surround the first through-hole 11a and comes into contact with the surface 300a of the composite material 300 and a recessed groove portion 22a which communicates with a suction hole 32a connected to a negative pressure source (not shown). In a case where the holding portions 20a are elastically deformed in accordance with the surface shape of the composite material 300, the bottom surfaces 21a come into contact with the surface 300a of the composite material 300. Meanwhile, the recessed groove portions 22a form a closed space, which communicates with the negative pressure source via the suction hole 32a, along with the surface 300a of the composite material 300.

The router guide 101 having the guide portions 10a is formed of an elastic material. Accordingly, in a case where air in the recessed groove portions 22a is discharged from the suction hole 32a by the negative pressure source (not shown) in a state where the bottom surfaces 21a are in contact with the surface 300a of the composite material 300, the state where the router guide 101 is elastically deformed in accordance with the surface shape of the composite material 300 is maintained.

Figure 14:
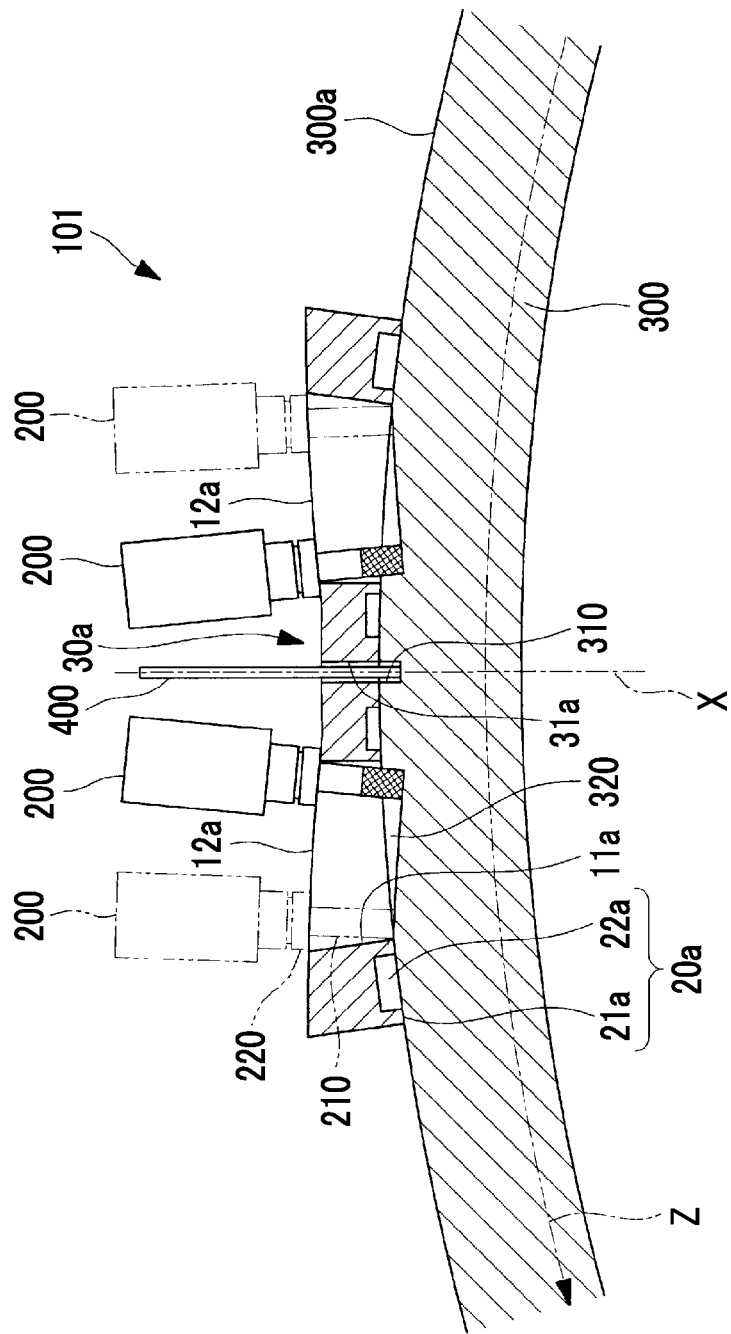
FIG. 14 is a sectional view taken along line D-D of the router guide shown in FIG. 12.

FIG. 14 shows the state where the router guide 101 is elastically deformed in accordance with the surface shape of the composite material 300 by the operation of the negative pressure source. As shown in FIG. 14, the guide surfaces 12a are formed such that distances from the surface 300a gradually decrease as the guide surfaces 12a approach the second through-hole 31a in a state where the bottom surfaces 21a of the holding portions 20a are in contact with the surface of the composite material 300.

In addition, as shown in FIG. 14, in a case where the guide portions 10a are elastically deformed in accordance with the surface shape of the composite material 300, the bottom surfaces 21a of the holding portions 20a holds the positions of the guide surfaces 12a with respect to the surface 300a at the positions in accordance with the surface shape of the composite material 300.

As shown in FIG. 14, the positioning portion 30a includes the second through-hole 31a into which the positioning pin 400 positioned in the positioning hole 310 formed in the composite material 300 is inserted. The positioning portion 30a causes the guide portions 10a to be positioned at predetermined positions in the radial direction extending along the axis Z orthogonal to the axis X in which the positioning pin 400 extends in a state where the positioning pin 400 is inserted into the second through-hole 31a.

As shown in FIG. 14, a worker operating the router devices 200 inserts the cutting tools 210 of the router devices 200 into end portions (positions shown by dashed lines in FIG. 14) of the first through-holes 11a farthest from the second through-hole 31a in a state where the router guide 101 is positioned at the composite material 300 by the positioning portion 30a.

The worker operating the router devices 200 moves the router device 200 in a direction approaching the second through-hole 31a while causing the lower surfaces of the cutting tool attachment portions 220 to come into contact with the guide surfaces 12a, and moves the router devices 200 to end portions (positions shown by solid lines in FIG. 14) of the first through-holes 11a closest to the second through-hole 31a in a state where the composite material 300 is cut by the cutting tools 210.

According to the above-described operations, the reference grooves 320 formed by the cutting portions 211 of the cutting tools 210 are formed on the surface 300a of the composite material 300. The guide surfaces 12a are formed such that the distances from the surface 300a gradually decreases as the guide surfaces 12a approach the second through-hole 31. Accordingly, the reference grooves 320 are formed so as to be gradually deeper as the reference grooves 320 approach the second through-hole 31a.

In this way, the second through-hole 31a of the router guide 101 is positioned in the positioning hole 310 of the composite material 300 by the positioning pin 400. Accordingly, it is possible to form the reference grooves 320 on the surface 300a of the composite material 300 at predetermined positions in the radial direction about the positioning hole 310 using the router devices 200.

According to the above-described present embodiment, the router guide 101 formed as a single member formed of an elastic material is elastically deformed in accordance with the surface shape of the composite material 300, and the cutting tool 210 of the router device 200 is sequentially inserted into each of the first through-holes 11a having the plurality of guide portions 10a, and thus, it is possible to form the plurality of reference grooves 320 in accordance with the surface shape of the composite material 300. In this case, unlike the router guide 100 of the first embodiment, the router guide itself does not rotate in the circumferential direction about the positioning hole 310, and it is possible to form the plurality of reference grooves 320 in a state where the router guide 101 is adsorbed to the composite material 300.

Accordingly, a worker cuts the surface 300a of the composite material 300 to have the same depth as those of the reference grooves 320 formed on the surface 300a of the composite material 300 based on the plurality of reference grooves 320. Therefore, it is possible to perform the scarf processing manually with sufficient processing accuracy.

Third Embodiment

Next, a third embodiment of the present invention will be described. The present embodiment is a modification example of the second embodiment, and is assumed to be similar to the second embodiment unless otherwise described below.

In the router guide 101 of the second embodiment, the plurality of guide portions 10a having the first through-holes 11a extending radially are formed at a plurality of positions around the axis X along which the positioning pin 400 extends.

Meanwhile, a router guide 102 of the present embodiment includes a first through-hole 11b which is formed in a spiral shape extending in the circumferential direction around the axis X along which the positioning pin extends.

Figure 15:
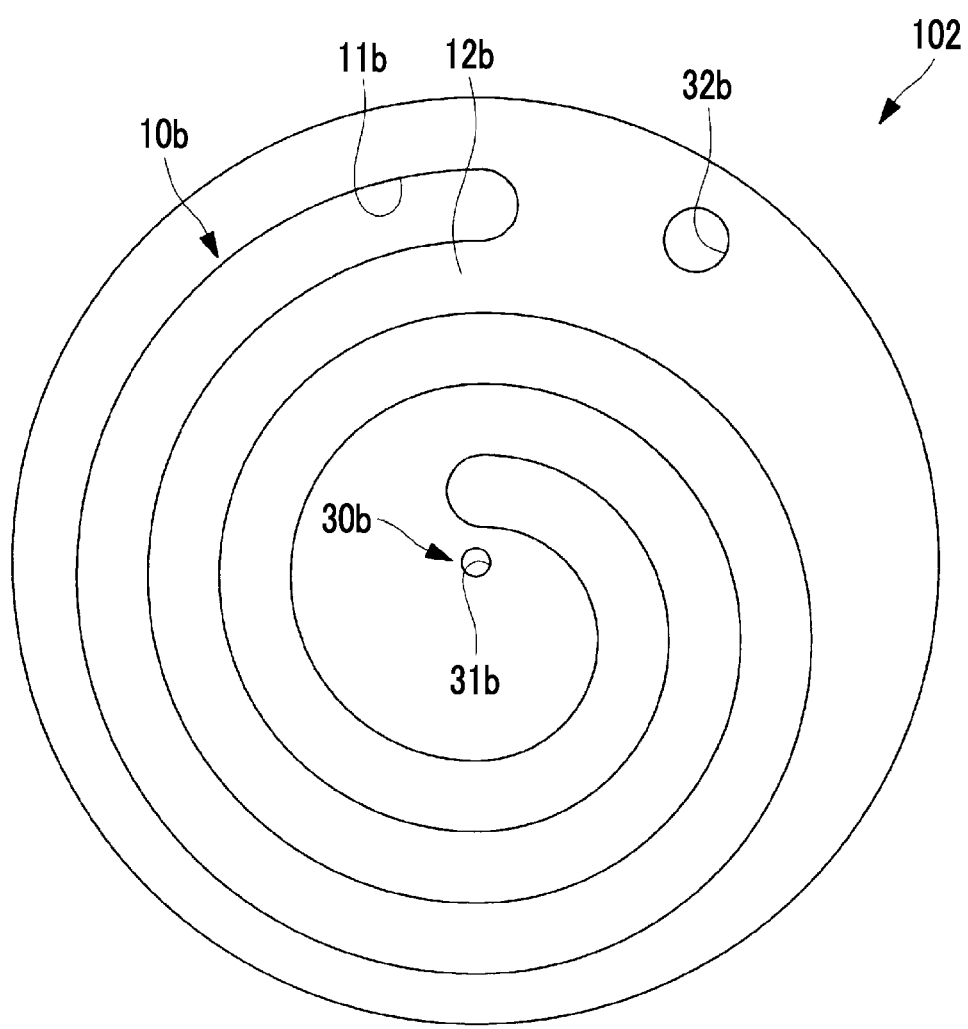
FIG. 15 is a plan view showing a router guide of a third embodiment.
Figure 16:
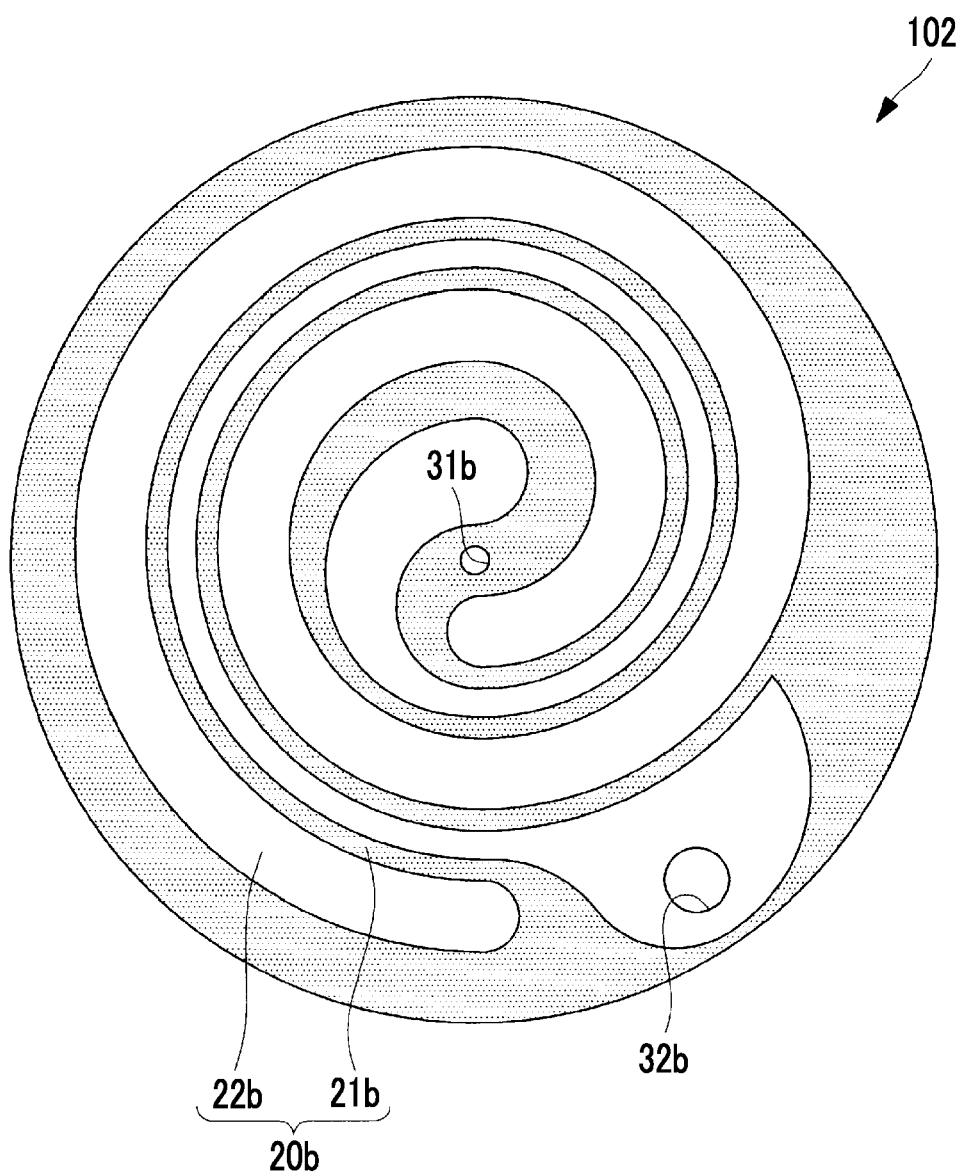
FIG. 16 is a bottom view showing the router guide of the third embodiment.

As shown in a plan view of FIG. 15 and a bottom view of FIG. 16, the router guide 102 is a device in which a guide portion 10b which has a first through-hole 11b and a guide surface 12b, a holding portion 20b which comes into contact with the surface 300a of the composite material 300 and holds the position of the guide surface 12b with respect to the surface 300a, and a positioning portion 30b which has a second through-hole 31b into which a positioning pin 400 is inserted are formed as a single member formed of an elastically deformable elastic material.

As shown in FIG. 16, the holding portion 20b includes a bottom surface 21b which is formed to surround the first through-hole 11b formed in a spiral shape in the circumferential direction about the second through-hole 31b and comes into contact with the surface 300a of the composite material 300, and a recessed groove portion 22b which communicates with a suction hole 32b connected to a negative pressure source (not shown). In a case where the holding portion 20b is elastically deformed in accordance with the surface shape of the composite material 300, the bottom surface 21b comes into contact with the surface 300a of the composite material 300. Meanwhile, the recessed groove portion 22b forms a closed space, which communicates with the negative pressure source via the suction hole 32b, along with the surface 300a of the composite material 300.

The router guide 102 having the guide portion 10b is formed of an elastic material. Accordingly, in a case where air in the recessed groove portion 22b is discharged from the suction hole 32b by the negative pressure source (not shown) in a state where the bottom surface 21b is in contact with the surface 300a of the composite material 300, the state where the router guide 102 is elastically deformed in accordance with the surface shape of the composite material 300 is maintained.

The guide surface 12b shown in FIG. 15 is formed such that a distance from the surface 300a gradually decreases as the guide surface 12b approaches the second through-hole 31b in a state where the bottom surface 21b of the holding portion 20b is in contact with the surface of the composite material 300.

In addition, in a case where the guide portion 10b is elastically deformed in accordance with the surface shape of the composite material 300, the bottom surface 21b of the holding portion 20b holds the position of the guide surface 12b with respect to the surface 300a at the position in accordance with the surface shape of the composite material 300.

A worker operating the router device 200 inserts the cutting tool 210 of the router device 200 into an end portion of the first through-hole 11b farthest from the second through-hole 31b in a state where the router guide 102 is positioned at the composite material 300 by the positioning portion 30b.

The worker operating the router device 200 spirally moves the router device 200 in a direction approaching the second through-hole 31b while causing the lower surface of the cutting tool attachment portion 220 to come into contact with the guide surface 12b, and moves the router device 200 to an end portion of the first through-hole 11b closest to the second through-hole 31b in a state where the composite material 300 is cut by the cutting tool 210.

According to the above-described operations, a spiral reference groove (not shown) formed by the cutting portion 211 of the cutting tool 210 is formed on the surface 300a of the composite material 300. The guide surface 12b is formed such that the distance from the surface 300a gradually decreases as the guide surface 12b approaches the second through-hole 31b. Accordingly, the reference groove is formed so as to be gradually deeper as the reference groove approaches the second through-hole 31b.

In this way, the second through-hole 31b of the router guide 102 is positioned in the positioning hole 310 of the composite material 300 by the positioning pin. Accordingly, it is possible to form the spiral reference groove 320 extending in the circumferential direction about the positioning hole 310.

Accordingly, a worker cuts the surface 300a of the composite material 300 to have the same depth as that of the reference groove 320 formed on the surface 300a of the composite material 300 based on the spiral reference groove 320. Therefore, it is possible to perform the scarf processing manually with sufficient processing accuracy.

Fourth Embodiment

Next, a fourth embodiment of the present invention will be described. The present embodiment is a modification example of the first embodiment, and is assumed to be similar to the first embodiment unless otherwise described below.

The router guide 100 of the first embodiment is the device in which the guide portion 10, the holding portion 20, and the positioning portion 30 are formed as a single member formed of an elastic material.

Meanwhile, a router guide 103 of the present embodiment includes a guide portion 10c which is formed of a thin plate-shaped metal member which can be elastically deformed, a holding portion 20c which has a plurality of pin members 23 formed so as to protrude from a plurality of locations of the lower surface of the guide portion 10c facing the surface 300a of the composite material 300, and the positioning portion 30c in which a second through-hole 31c is formed.

Figure 17:
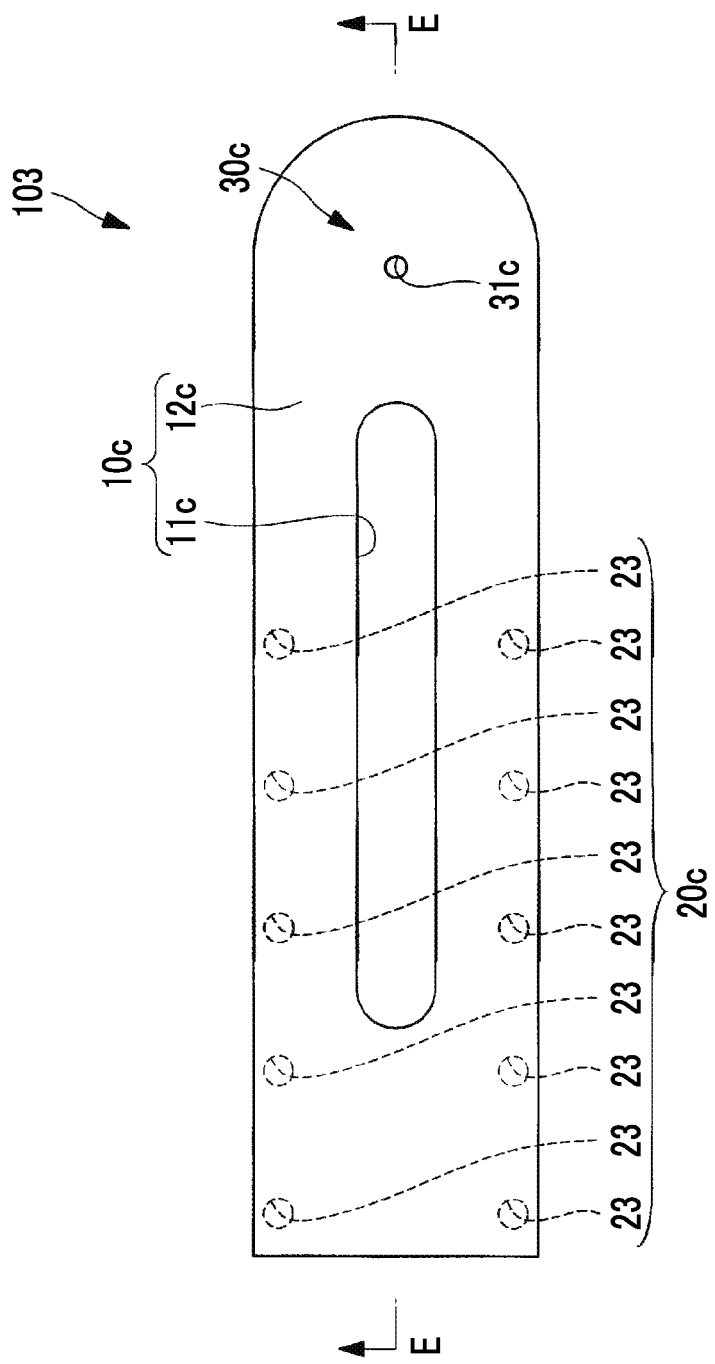
FIG. 17 is a plan view showing a router guide of a fourth embodiment.
Figure 18:
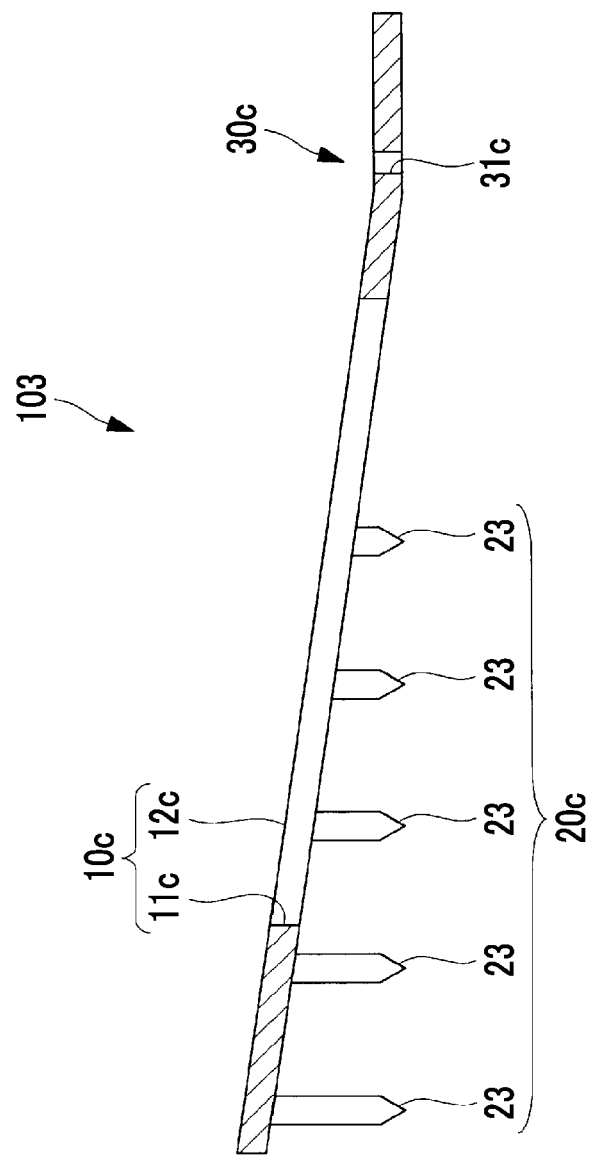
FIG. 18 is a longitudinal sectional view taken along line E-E of the router guide shown in FIG. 17.

As shown in a plan view of FIG. 17 and FIG. 18 (a longitudinal sectional view taken along line E-E of the router guide 103 shown in FIG. 17), the router guide 103 includes the guide portion 10c which includes a first through-hole 11c and a guide surface 12c, the holding portion 20c which comes into contact with the surface 300a of the composite material 300 (refer to FIG. 19) and holds the position of the guide surface 12c with respect to the surface 300a, and the positioning portion 30c which has the second through-hole 31c into which the positioning pin 400 (refer to FIG. 19) is inserted.

As shown in FIGS. 17 and 18, the guide portion 10c and the positioning portion 30c are integrally formed as a single member formed of a thin plate-shaped metal member. Meanwhile, the plurality of pin members 23 included in the holding portion 20c are attached to the rear surface of the guide portion 10c by welding or the like so as to be arranged in a long side direction and disposed on both end portions in a short side direction of the guide portion 10c.

Figure 19:
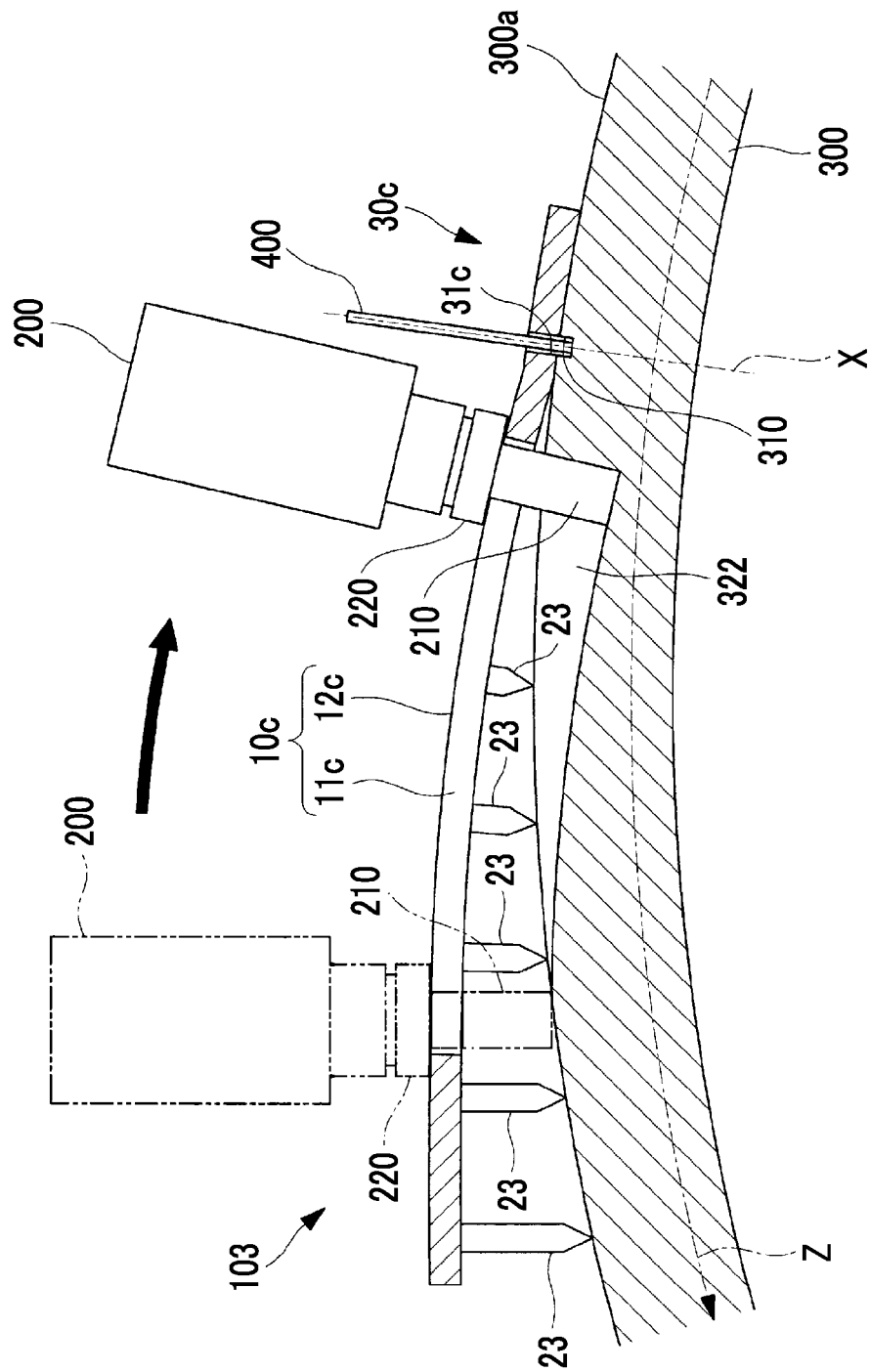
FIG. 19 is a longitudinal sectional view showing a state where the router guide of the fourth embodiment is attached to the composite material.

FIG. 19 shows a state where the router guide 103 is elastically deformed in accordance with the surface shape of the composite material 300. Both end portions (end portions in right and left directions in FIG. 19) in the long side direction of the router guide 103 are bonded to the surface 300a of the composite material 300 by a tape or the like, and thus, a state shown in FIG. 19 is maintained.

As shown in FIG. 19, the guide surface 12c is formed such that a distance from the surface 300a gradually decreases as the guide surface 12c approaches the second through-hole 31c in a state where the pin members 23 of the holding portion 20c is in contact with the surface 300a of the composite material 300.

In addition, as shown in FIG. 19, in a case where the guide portion 10c is elastically deformed in accordance with the surface shape of the composite material 300, the pin members 23 of the holding portion 20c hold the position of the guide surface 12c with respect to the surface 300a at the position in accordance with the surface shape of the composite material 300.

As shown in FIG. 19, the positioning portion 30c includes the second through-hole 31c into which the positioning pin 400 positioned in the positioning hole 310 formed in the composite material 300 is inserted. The positioning portion 30c causes the guide portion 10c to be positioned at a predetermined position in the radial direction extending along an axis Z orthogonal to the axis X in which the positioning pin 400 extends in a state where the positioning pin 400 is inserted into the second through-hole 31c.

As shown in FIG. 19, a worker operating the router device 200 inserts the cutting tool 210 of the router device 200 into an end portion (a position shown by dashed lines in FIG. 19) of the first through-hole 11c farthest from the second through-hole 31c in a state where the router guide 103 is positioned at the composite material 300 by the positioning portion 30c.

If the worker operating the router device 200 moves the router device 200 in a direction approaching the second through-hole 31c while causing the lower surface of the cutting tool attachment portion 220 to come into contact with the guide surface 12c, and the cutting tool 210 moves to an end portion (a position shown by solid lines in FIG. 19) of the first through-hole 11c closest to the second through-hole 31c.

According to the above-described operations, a reference groove 322 is formed by the cutting portion of the cutting tool 210 on the surface 300a of the composite material 300. The guide surface 12c is formed such that the distance from the surface 300a gradually decreases as the guide surface 12c approaches the second through-hole 31c. Accordingly, the reference groove 322 is formed so as to be gradually deeper as the reference groove 322 approaches the second through-hole 31c.

In this way, the second through-hole 31c of the router guide 103 is positioned in the positioning hole 310 of the composite material 300 by the positioning pin 400. Accordingly, it is possible to form the reference groove 322 on the surface 300a of the composite material 300 at a predetermined position in the radial direction about the positioning hole 310 using the router device 200.

In addition, a worker can radially form the plurality of reference grooves 322 at the plurality of positions in the circumferential direction about the positioning hole 310 of the surface 300a of the composite material 300 using the router guide 103. The step of radially forming the plurality of reference grooves 322 is similar to the step of radially forming the plurality of reference grooves 320 of the first embodiment, and thus, descriptions thereof are omitted.

According to the router guide 103 of the above-described present embodiment, the thin plate-shaped metal member which can be elastically deformed is elastically deformed in accordance with the surface shape of the composite material 300, the position of the guide surface 12c with respect to the surface 300a of the composite material 300 is held by the pin members 23. Accordingly, it is possible to form the reference groove 322 in accordance with the surface shape of the composite material 300.

Other Embodiments

In the above descriptions, the case where the workpiece on which the reference grooves 320 are formed by the router device 200 is the composite material 300 is described. However, other workpieces may be adopted. For example, workpieces which use other materials such as metal may be adopted.

REFERENCE SIGNS LIST 10, 10a, 10b, 10c: guide portion
11, 11a, 11b, 11c: first through-hole
12, 12a, 12b, 12c: guide surface
20, 20a, 20b, 20c: holding portion
21: bottom surface (contact portion)
22: recessed groove portion
23: pin member
30, 30a, 30b, 30c: positioning portion
31, 31a, 31b, 31c: second through-hole
32, 32a, 32b: suction hole 100, 101, 102, 103: router guide (guide device)
200: router device
210: cutting tool
211: cutting portion
220: cutting tool attachment portion
230: stopper
300: composite material (workpiece)
300a: surface
300b: scarfed surface
300c: bottom surface portion
310: positioning hole
320, 321, 322: reference groove
400: positioning pin
X, Y, Z: axis

The invention claimed is:

1. A guide device which guides a router device, which rotates a cutting tool having an outer peripheral surface on which a cutting portion is formed and cuts a workpiece coming into contact with the cutting portion, in accordance with a surface shape of the workpiece having a curvature in at least a predetermined direction, comprising:
   a guide portion which includes a first through-hole into which the cutting tool can be inserted, and a guide surface which guides an attachment portion of the router device to which the cutting tool is attached in a state where the cutting tool is inserted into the first through-hole along the first through-hole;
   a holding portion which comes into contact with a surface of the workpiece and holds a position of the guide surface with respect to the surface of the workpiece; and
   a positioning portion which includes a second through-hole into which a positioning pin positioned in a positioning hole formed in the workpiece is inserted and positions the guide portion at a predetermined position in a radial direction intersecting an axis in which the positioning pin extends in a state where the positioning pin is inserted into the second through-hole,
   wherein the guide surface is formed such that a distance from the surface of the workpiece decreases as the guide surface approaches the second through-hole in a state where the holding portion is in contact with the surface of the workpiece,
   wherein the guide portion is formed to be elastically deformable, and
   wherein in a case where the guide portion is elastically deformed in accordance with the surface shape of the workpiece, the holding portion holds the position of the guide surface with respect to the surface of the workpiece at a position corresponding to the surface shape.

2. The guide device according to claim 1,
   wherein the guide portion, the holding portion, and the positioning portion are formed as a single member formed of an elastic material.

3. The guide device according to claim 2,
   wherein a plurality of the guide portions having the first through-hole extending in the radial direction are formed at a plurality of positions around the axis.

4. The guide device according to claim 2,
   wherein the first through-hole is formed in a spiral shape which extends in a circumferential direction around the axis.

5. The guide device according to claim 2,
   wherein the holding portion includes a contact portion which is formed to surround the first through-hole and comes into contact with the surface of the workpiece, and a recessed groove portion which communicates with a suction hole connected to a negative pressure source, and
   wherein in a case where air in the recessed groove portion is discharged from the suction hole by the negative pressure source in a state where the contact portion is in contact with the surface of the workpiece, the guide portion is elastically deformed in accordance with the surface shape of the workpiece.

6. The guide device according to claim 1,
   wherein the guide portion is a plate-shaped metal member, and
   wherein the holding portion is a plurality of pin members which are formed to protrude from a plurality of locations on one surface of the metal member.

* * * * *